(12) United States Patent
Okamoto et al.

(10) Patent No.: US 6,605,906 B2
(45) Date of Patent: Aug. 12, 2003

(54) LIGHT SOURCE DEVICE

(75) Inventors: Masashi Okamoto, Akashi (JP); Takashi Yamashita, Takasago (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/141,823

(22) Filed: May 10, 2002

(65) Prior Publication Data

US 2002/0167284 A1 Nov. 14, 2002

(30) Foreign Application Priority Data

May 11, 2001 (JP) .......................... 2001-141622

(51) Int. Cl.[7] .......................... H05B 37/02; H05B 37/00
(52) U.S. Cl. .......................... 315/291; 315/225; 315/308
(58) Field of Search .......................... 315/307, 308, 315/224, 58, 209 R, 56, 291, 51, 61, 63, 225, 202, 207

(56) References Cited

FOREIGN PATENT DOCUMENTS

EP     1 139 700 A1    10/2001

*Primary Examiner*—Don Wong
*Assistant Examiner*—Chuc D Tran
(74) *Attorney, Agent, or Firm*—Nixon Peabody LLP; David S. Safran

(57) ABSTRACT

A light source device in which a discharge lamp, which contains greater than or equal to 0.15 mg mercury per cubic millimeter of the volume of the discharge space, and in which there is a pair of electrodes disposed opposite one another, is connected to a feed device (Ex). The feed device is used to start the discharge lamp and to supply the discharge current to the electrodes. The feed device (Ex) serves an identification function identifying a discharge state of the discharge lamp as a glow discharge state. Further, during the identification of the glow discharge state, the electric power supplied to the discharge lamp is set at less than or equal to twice as high as the nominal electric power of the above described discharge lamp to eliminate the formation of blackening on the inside of the bulb glass during glow discharge.

2 Claims, 12 Drawing Sheets

LIGHT SOURCE DEVICE

BACKGROUND OF THE INVENTION

1. Field of the Invention

The invention relates to a light source device using a high pressure mercury discharge lamp which is used, for example, as a light source for a projector.

2. Description of the Prior Art

In a light source device for an optical device, such as a liquid crystal projector, a DLP or the like, a discharge lamp with high radiance (HID lamp) is used. Recently, high pressure mercury discharge lamps have been used more and more due to their high efficiency of conversion of their making power into light intensity.

For driving a discharge lamp there are a direct current (dc) drive and an alternating current (ac) drive. In the dc drive the polarity of the two poles of the electrodes of the discharge lamp, i.e., the condition that one of the electrodes is a cathode and the other electrode is an anode, is not changed. In the ac drive the relation between the anode and cathode is changed essentially periodically. In the ac drive, with reference to the speed of the polarity change, i.e., with reference to the control frequency, driving in a wide frequency range from a few dozen hertz to a few megahertz is enabled.

With respect to the arrangement of the feed device for supplying the discharge current to the above described discharge lamp, expressed in very rough terms, the following is described.

In a feed device for the ac drive, downstream of a ballast circuit, such as a chopper circuit or the like, and in a feed device for a dc drive, an inverter for inverting the polarity is added.

Since operation of the feed device and the behavior of the discharge lamp in dc drive and ac drive are the same when this discharge lamp is started, if we consider that the above described inverter is excluded, mainly a case of dc drive is easily described below using FIGS. 16(a) & 16(b). In FIG. 16(a) the time change of the lamp voltage (VL) is shown schematically, while in FIG. 16(b) the time change of the lamp current (IL) is shown schematically.

The starting sequence of the feed device is initiated with the application of a voltage, which is called the no-load voltage, to the discharge lamp. An interval (T01) corresponds to the start of the starting sequence. At an instant (tz) a starter is operated which produces a high voltage. Between the two poles of the above described discharge lamp, a high voltage (Vz) is applied and in the discharge space an insulation breakdown is produced, the latter acting as a cause for the discharge being started.

Following this insulation breakdown, a brief reduction (Vza) of the lamp voltage (VL) becomes apparent. But depending on the adhesion state of the mercury to the lamp there is also a case in which this cannot be clearly observed, or a case in which it can be detected for a few milliseconds or over a longer interval. Following the insulation breakdown a relatively large equalization current (Iza) flows in the lamp. This is because, as a result of the acute reduction of the lamp voltage (VL), the electrical charge stored in a smoothing capacitor of the ballast circuit is released.

After a relatively unstable discharge, directly after one such insulation breakdown, a transition occurs to a discharge which is called a glow discharge.

Generally a glow discharge has a higher discharge voltage and a lower current density than an arc discharge. When in a stable glow discharge interval (T11) the temperature of the electrodes, especially of the cathode, increases enough and a temperature is reached at which thermionic emission is possible, the discharge form passes into an arc discharge and a transition to an initial interval (T31) of an arc discharge takes place, in which the lamp temperature is not yet high enough, in which therefore the vapor pressure of the mercury is low, and in which therefore the discharge voltage of the lamp is low. In this initial interval (T31) of the arc discharge, normally for the feed device of the lamp the nominal electric power cannot be supplied. This is because an overly large current must be allowed to flow when the attempt is made to reach the nominal electric power at an overly low voltage, and because overly high heat generation of the switching devices of the feed device takes place, the electric power being computed as the product of the voltage and current.

In an interval (T32) in which the lamp temperature slowly rises, the lamp voltage increases over time. When the lamp current drops en route, which is necessary to achieve the nominal electric power, and when it drops to less than or equal to an upper boundary value ILmax of an allowable lamp current of the feed device, the nominal electric power is supplied to the lamp until a steady state (T33) is reached and maintained. Normally, this takes roughly 1 to 2 minutes.

With respect to the lamp service life, there are several different factors, such as for example wear of the electrodes which depends on the cumulative length of illumination of the lamp, the accumulated stress on the bulb glass which depends on the thermal behavior, and which causes lamp damage, and similar factors. There was especially the disadvantage of formation of blackening on the inside of the bulb glass as a service life factor in conjunction with a glow discharge.

As was described above, a glow discharge has a high voltage. The cations in the discharge plasmas are accelerated by high energy and collide with the cathode. As a result, the cathode material, such as tungsten or the like, vaporizes by sputtering. It can be imagined that on the inside of the above described bulb glass blackening therefore occurs and that the above described vaporized material is deposited on the inside of the bulb glass. Due to this factor, the lamp service life therefore progresses depending on the frequency of flashing and luminous operation of the lamp.

Such suitable control of the behavior of the system in a glow discharge, i.e., during the stable glow discharge interval (T11), for an interval (T12) during which the glow discharge increases, and during an interval (T21) during which the glow discharge drops, as shown in FIGS. 16(a) & 16(b), is a very important element for the lamp service life. Nevertheless, until now, a sufficiently attentive check has not been done; this was especially the case in a HID lamp which contains greater than or equal to 0.15 mg mercury per cubic millimeter of volume of the discharge space.

Japanese patent disclosure document 2001-6895 (U.S. patent application Ser. No. 09/720,092; EP 1139700 A1) discloses an invention in which a feed device for a high pressure mercury discharge lamp which contains greater than or equal to 0.15 mg mercury per cubic millimeter volume of the discharge space is arranged such that for a glow discharge an electric power is allowed which exceeds a certain value.

However, here, a temporary character feature is mentioned which a feed device is supposed to have which can prevent the discharge from disappearing when the discharge state of the discharge lamp returns from the initial interval (T31) of the arc discharge to the glow discharge after a transition to the arc discharge has taken place once.

This means that the description of the invention and the prior art in the aforementioned publication does relate to the temporary behavior described below in movement from one point to another point on the characteristic (Fp0) of the constant electric power and on a characteristic which relates to the area between a point (P0g) and a point (POc) in the invention described in these application documents in FIG. 2. The specification of the invention and description of the prior art in the above described publication however did not mention at all the disadvantage of formation of blackening on the inside of the bulb glass for the duration of the glow discharge in itself as a result of an output current-voltage characteristic in the glow discharge according to the characteristic shown in FIG. 2 (F1a).

Recently, there has been a demand to save energy to prevent global warming. With respect to the above described optical device, it is therefore desirable to turn it off as often as possible. But since the above described service life, as a result of blackening in a glow discharge, progresses depending on the frequency of flashing and luminous operation of the lamp, with respect to the lamp service life a mode of use is advantageous in which there is as little flashing as possible. One such mode of use however contradicts the above described demand for saving energy.

SUMMARY OF THE INVENTION

The object of the invention is to eliminate the disadvantage in the prior art, i.e., the disadvantage of the formation of blackening on the inside of the bulb glass in a glow discharge.

This object is achieved in accordance with the invention as follows.

In accordance with a first aspect of the invention, the object is achieved in a light source device in which a discharge lamp which contains greater than or equal to 0.15 mg mercury per cubic millimeter of the volume of the discharge space, and in which a pair of electrodes opposite one another is connected to a feed device (Ex). The feed devices is used to start the above described discharge lamp and to supply the discharge current to the above described electrodes. The above described feed device (Ex) has the function of identifying that the discharge state of the above described discharge lamp is a glow discharge state, and that during the identification of the above described glow discharge state control is exercised such that the electric power supplied to the above described discharge lamp is set at less than or equal to twice as high as the nominal electric power of the above described discharge lamp.

In accordance with another aspect of the invention, the object is achieved in a light source device in which a discharge lamp which contains greater than or equal to 0.15 mg mercury per cubic millimeter of the volume of the discharge space, and in which a pair of electrodes opposite one another is connected to a feed device (Ex). The feed device is used to start the above described discharge lamp and to supply the discharge current to the above described electrodes. The above described feed device (Ex) consists of a ballast circuit (Bx) and a dc source (Mx) which is used to supply the above described ballast circuit (Bx) and that the above described dc source (Mx) exercises control with respect to its power supply capacity such that the power supplied to the above described discharge lamp is set at less than or equal to twice as high as the nominal electric power of the above described discharge lamp.

The invention is further described below with reference to the embodiments shown in the drawings.

BRIEF DESCRIPTION OF THE DRAWINGS

FIG. 16 (b) shows a schematic of the time change of the lamp current of a light source device using a high pressure mercury lamp.

DETAILED DESCRIPTION OF THE INVENTION

Figure 1:
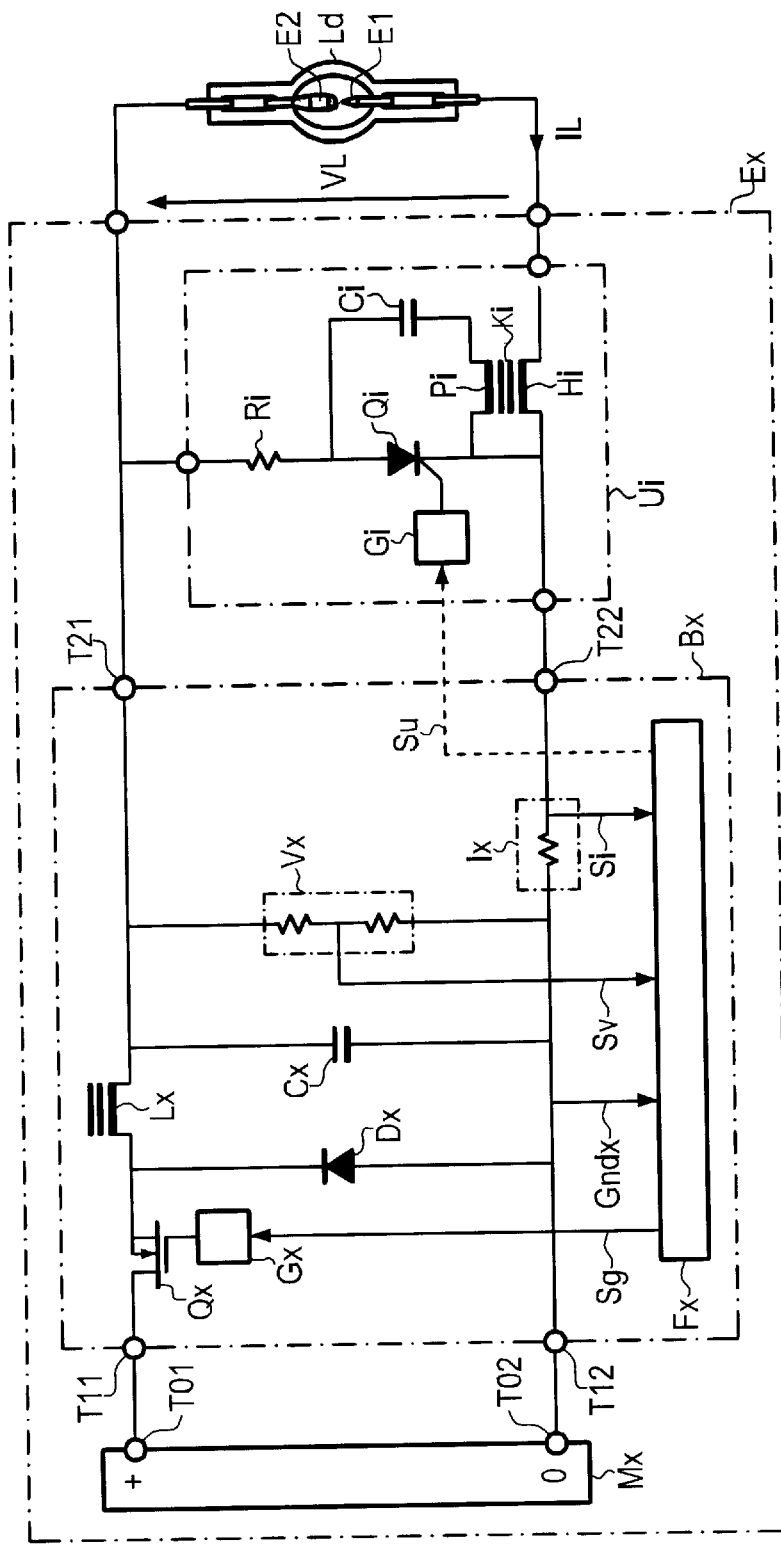
FIG. 1 shows a schematic of a simplified example of the arrangement of a light source device in accordance with the invention, of the internal trigger starter type, which is driven using a direct current.

FIG. 1 is a schematic of a simplified example of the arrangement of the above described light source device of the dc drive type. Reference letters Ex label a feed device in which a ballast circuit (Bx) of the voltage reduction chopper type is operated by receiving a voltage supply from a dc source (Mx), such as a PFC or the like. In the above described ballast circuit (Bx), a switching device (Qx) such as a FET or the like turns on or off the current from the dc source (Mx) and charges a smoothing capacitor (Cx) via a choke (Lx). This voltage is applied to the discharge lamp (Ld). Thus the current can be allowed to flow in the discharge lamp (Ld).

During the interval during which the above described switching device (Qx) is in the ON state, charging of the smoothing capacitor (Cx) and current supply to the discharge lamp (Ld) as a load are carried out directly by the current through the switching device (Qx). Moreover, energy in the form of a current is stored in the choke (Lx). During the interval during which the above described switching device (Qx) is in the OFF state, the smoothing capacitor (Cx) is charged by the energy stored in the form of a current in the choke (Lx) via a fly-wheel diode (Dx) and current is supplied to the discharge lamp (Ld).

In a starter (Ui), a capacitor (Ci) is charged by the lamp voltage (VL) via a resistor (Ri). When a gate driver circuit (Gi) is activated, a switching device (Qi) which consists of a thyristor or the like is closed. In this way the capacitor (Ci) is discharged via the primary winding (Pi) of a transformer (Ki) and on the secondary winding (Hi) a high voltage pulse is formed. The high voltage pulse formed on the secondary winding (Hi) of the starter (Ui) is superimposed by the output voltage of the ballast circuit (Bx) and lies between the electrodes (E1, E2). Thus, the discharge of the discharge lamp (Ld) can be started.

A gate driver signal (Sg) is produced by a feed control circuit (Fx); this signal has a certain pulse duty factor and is added to a gate terminal of the above described switching device (Qx) via a gate driver circuit (Gx). This controls turning the current from the above described dc source (Mx) on and off.

The lamp current (IL) which flows between the electrodes (E1, E2) of the above described discharge lamp (Ld) and the lamp voltage (VL) which forms between the electrodes (E1, E2) can be determined by a current determination means (Ix) and voltage determination means (Vx). The above described current determination means (Ix) can be easily implemented using a shunt resistor and the above described voltage determination means (Vx) can be implemented using a partial pressure resistor.

A lamp current signal (Si) from the above described current determination means (Ix) and a lamp voltage signal (Sv) from the above described voltage determination means (Vx) are input into the feed control circuit (Fx). Based on the difference between the discharge states of the discharge lamp (Ld) at this instant, i.e., whether the discharge lamp (Ld) is in the undischarged state, in the glow discharge state (under certain circumstances in some kind of a glow discharge state) or in the arc discharge state (under certain circumstances in some kind of an arc discharge state), the pulse duty factor of the above described gate driver signals (Sg) is feedback-controlled such that the lamp current (IL) and the lamp voltage (VL) or the lamp electric power as the product of this current and this voltage has a reduced difference to its setpoint.

As described above, suitable control of the behavior of the system in a glow discharge is an element which is very important for the lamp service life. Therefore, it becomes possible to eliminate the disadvantage of formation of blackening on the inside of the bulb glass in a glow discharge by suppressing the supply of an overly large electric power to the above described discharge lamp (Ld) for the duration of the glow discharge, and by fixing the power supplied to the above described discharge lamp at less than or equal to twice the nominal electric power of the above described discharge lamp.

Figure 6:
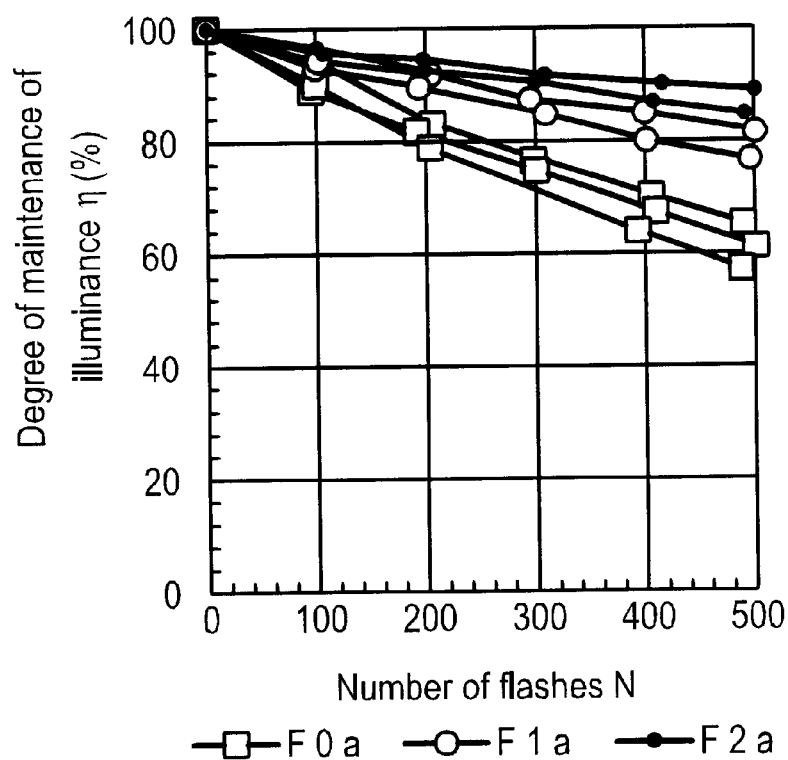
FIG. 6 shows a graphic representation of the experimental result of a measurement of the degree of maintenance of the illuminance of a light source device in accordance with the invention.

The action of the invention is described using FIG. 6 below, in which the experimental result of the inventors is shown. In FIG. 6, the attenuation of the amount of output light of the light source device is shown wherein the flash-luminous operation cycle in which the same type of lamp is operated for 25 minutes using different feed devices and is turned off for five minutes, was repeated roughly 500 times.

The test lamp was a lamp in which the bulb made of quartz glass is filled with 0.15 mg of mercury per cubic millimeter of volume of the discharge lamp, bromine and argon, and which has a nominal electric power of 150 W.

In practice, a discharge lamp (Ld) was installed such that, with respect to a parabolic reflector of borosilicate glass, the arc region between the electrodes (E1, E2) is located at the focal point of the above described parabolic reflector. The amount of output light of the light source device was measured at a distance of 1 m from the above described arc between the electrodes (E1, E2) such that using an illumination meter the illuminance was measured at one point which corresponds essentially to the middle area of the light flux. In FIG. 6, the y-axis plots the degree of maintenance of the illuminance by normalization, in which the illuminance at the start of the test was considered to be 100%.

In accordance with a first aspect of the invention, the feed device (Ex) was arranged using the feed control circuit (Fx1) shown in FIG. 8; this is described below using the first embodiment. In this way, the degree of maintenance of the illuminance at the end of the test in the case of a feed device with a characteristic was roughly 79%, at which the relation between the lamp current (IL) as the output of the above described feed device (Ex) and the lamp voltage (VL), i.e., the output current-voltage characteristic, is shown as the characteristic (F1a) between points (P0a), (P0b), (P0c), (P11), (P12), (P13), and (P0e) in FIG. 2.

Figure 2:
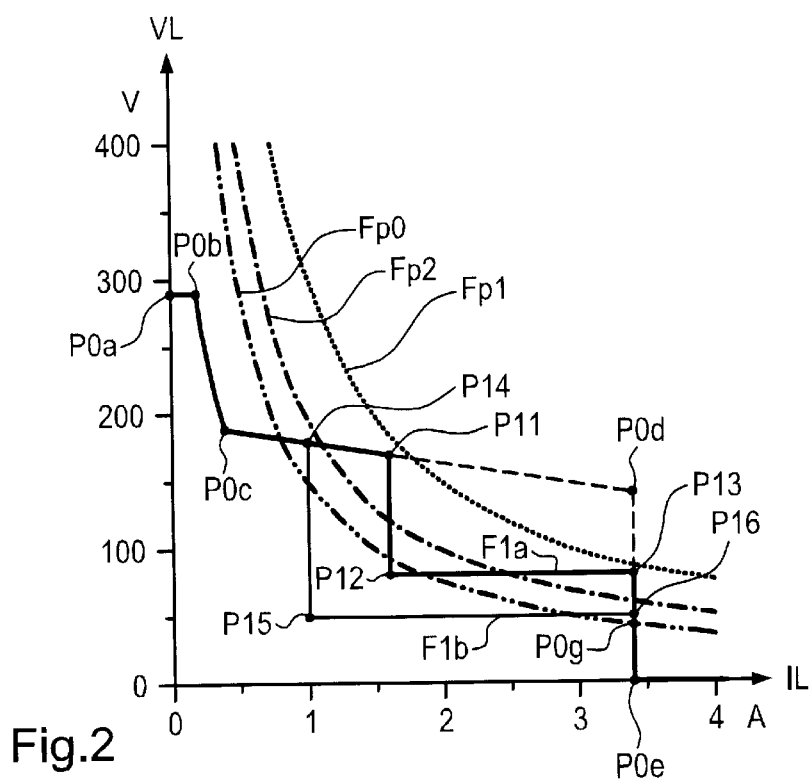
FIG. 2 shows a schematic of one example of the output current-voltage characteristic according to a first embodiment of a feed device of a light source device in accordance with the invention.

FIG. 2, also shows a current-voltage characteristic (Fp1) which corresponds to a constant electric power which is twice as high as the nominal electric power of the lamp. In all current and voltage ranges, the above described characteristic (F1a) is closer to the zero point side than the current-voltage characteristic (Fp1). Therefore, it becomes apparent that the above described feed device (Ex) with the characteristic (F1a) is arranged such that the electric power supplied to the above described discharge lamp is fixed at less than or equal to twice the nominal electric power of the above described discharge lamp.

Figure 17:
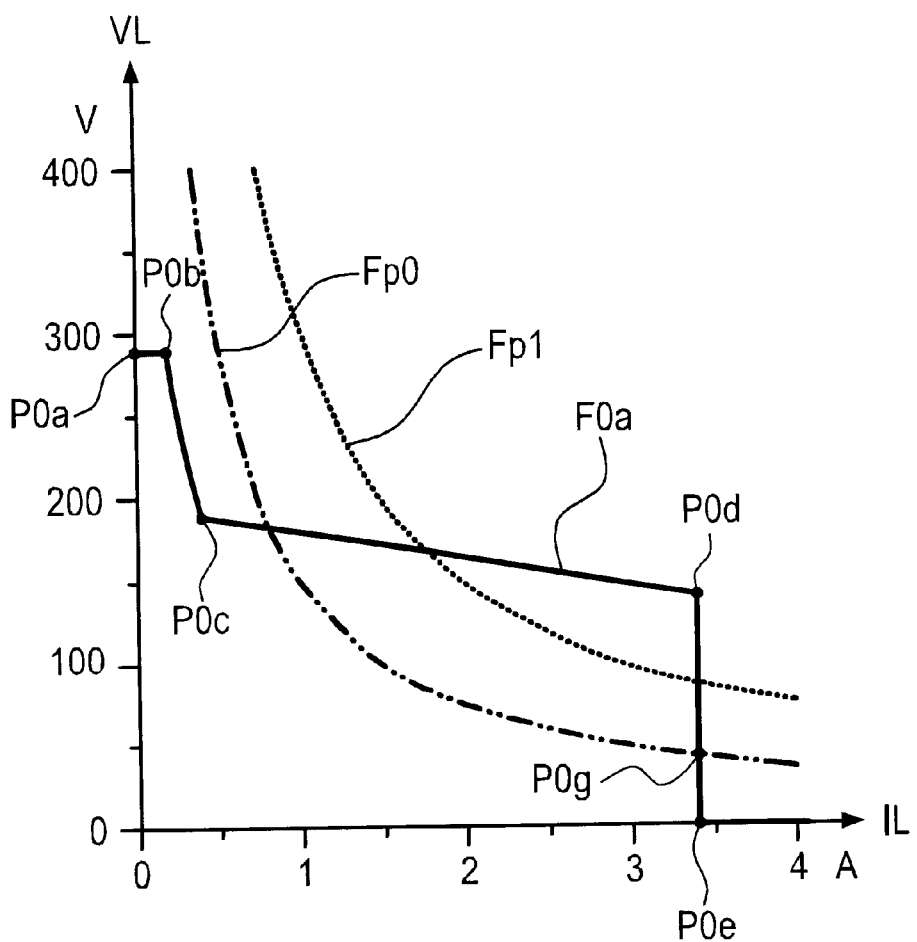
FIG. 17 shows a schematic of the output current-voltage characteristic of a feed device of a light source device which was used for comparison purposes in a test.

Conversely, as a comparison test, a feed device with an output current-voltage characteristic was used which is shown using the characteristic (F0a) shown in FIG. 17. Here, the degree of maintenance of illuminance at the instant of the end of the test was roughly 61%. FIG. 6 shows this experimental result.

However, the feed device with the characteristic (F0a) was arranged as follows:

The feed control circuit (FX1) of the feed device (Ex) in the first embodiment was used as the basis and a resistor (R12) in its circuit (Uc1) for producing the upper limit signal of the lamp current was removed.

For this reason, the arrangement was made such that there is an area between the points (P11), (P12) and (P13) of the characteristic (F1a) shown in FIG. 2 which represents a simple characteristic between points (P11), (P0d) and (P13).

The area in the vicinity of point (P0d) of the characteristic (F0a) shown above in FIG. 17 is in a state in which the electric power exceeds a certain range. Specifically the output current-voltage characteristic exceeds the current-voltage characteristic (Fp1) which corresponds to a constant electric power which is twice as high as the nominal electric power of the lamp. This exacerbates the above described defect of the formation of blackening on the inside of the bulb glass in a glow discharge. In the case of the characteristic (F1a) shown in FIG. 2, however, the electric power which exceeds a certain value is suppressed. The above described defect of the formation of blackening on the inside of the bulb glass in a glow discharge is therefore eliminated. Therefore, it can be assumed that the degree of maintenance of the illuminance has thus increased.

Furthermore, according to the invention, the feed device (EX) is arranged using the feed control circuit (Fx2) shown in FIG. 9; this is described below using the second embodiment. In this way the degree of maintenance of the illuminance at the time of the end of the test was roughly 87% in the case of a feed device with a characteristic at which the relation between the lamp current (IL) as the output of the above described feed device (Ex) and the lamp voltage (VL), i.e., the output current-voltage characteristic, is shown as the characteristic (F2a) between points (P2a),(P21), (P22), and (P2f) in FIG. 3. Likewise, an improvement compared to the case of the characteristic (F0a) shown above in FIG. 17 becomes apparent.

Figure 3:
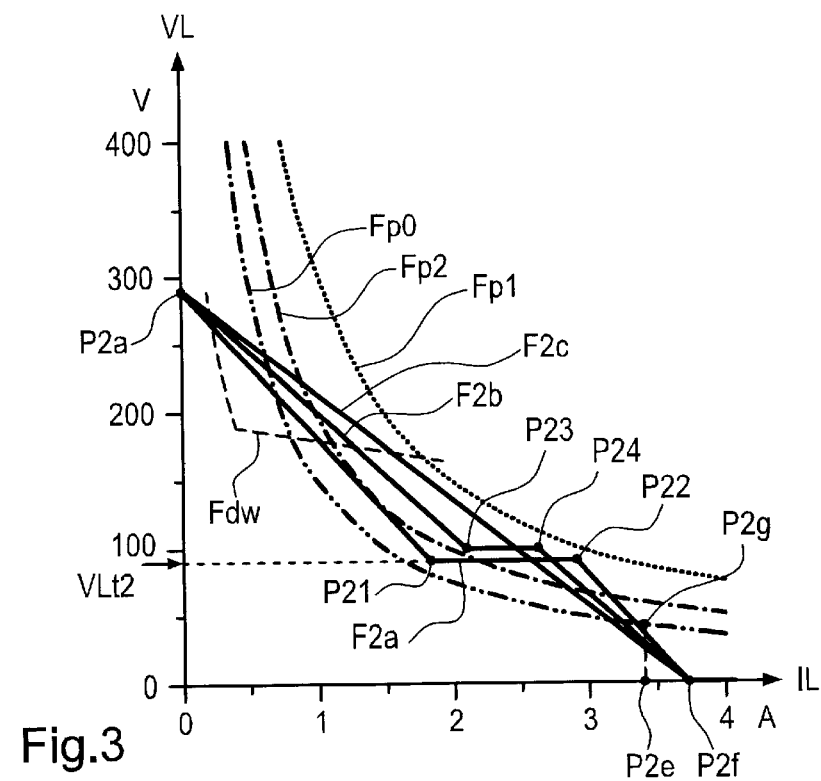
FIG. 3 shows a schematic of an example of the output current-voltage characteristic according to a second embodiment of a feed device of a light source device in accordance with the invention.

FIG. 3 also shows a current-voltage characteristic (Fp1) which corresponds to a constant electric power which is twice as high as the nominal electric power of the lamp. In all current and voltage ranges, the above described characteristic (F2a) is closer to the zero point side than the current-voltage characteristic (Fp1). It therefore becomes apparent that the above described feed device (Ex) with characteristic (F2a) is arranged such that the electric power supplied to the discharge lamp is fixed at less than or equal to twice the nominal electric power of the above described discharge lamp.

As was described above, in the feed device of the invention shown in FIG. 1 the electric power exceeding a certain value in a glow discharge is suppressed to less than or equal to twice the nominal electric power of the lamp. In this way, the above described defect of the formation of blackening on the inside of the bulb glass in a glow discharge is eliminated. It becomes apparent that thus the action of increasing the degree of maintenance of the illuminance results.

For the duration of the arc discharge, essentially the nominal electric power is supplied to the lamp or an electric power is supplied which is less than the nominal electric power, as during the above described initial duration (T31) of the arc discharge. Thus, it becomes apparent that the interval during which it is possible to supply an electric power which is greater than or equal to the nominal electric power is limited to the duration of the glow discharge.

Therefore, regardless of whether the discharge state of the discharge lamp is a glow discharge state or not, the above described defect of the formation of blackening on the inside of the bulb glass in a glow discharge is eliminated by the electric power supplied to the above described discharge lamp being set at less than or equal to twice as high as the nominal electric power.

Using this property, in the feed device in the invention described in claim 2, the power supply capacity of the dc source (Mx) is limited with respect to the ballast circuit (Bx). As a result, control is exercised such that the electric power supplied to the above described discharge lamp for the duration of the glow discharge is set at less than or equal to twice as high as the nominal electric power of the above described discharge lamp. Thus, as in the invention described in claim 1, the above described defect of formation of blackening on the inside of the bulb glass in a glow discharge is eliminated. It thus becomes apparent that the effect of increasing the degree of maintenance of the illuminance results.

Figure 7:
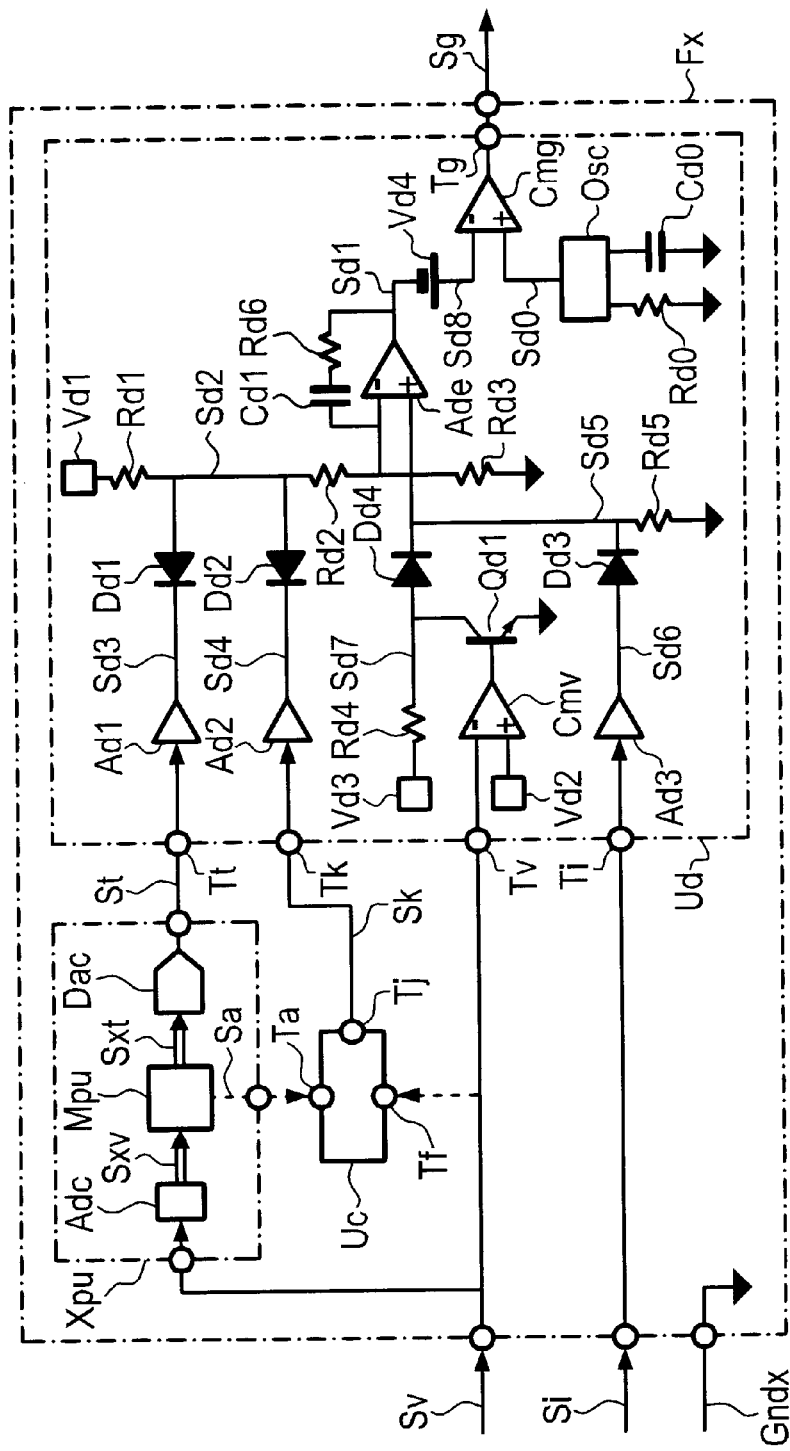
FIG. 7 shows a schematic of an example of the arrangement of a feed control circuit of a feed device of a light source device in accordance with the invention.

First, a first embodiment according to the invention is shown in FIG. 7 with respect to the simplified arrangement of the feed control circuit (Fx). The above described lamp voltage signal (Sv) is input to an A/D converter (Adc) in an overall controller (Xpu), converted into digital lamp voltage data (Sxv) with a suitable place number, and input into a microprocessor unit (Mpu) which comprises a CPU, a program storage, a data storage, a circuit for producing a clock pulse, a time counter, an IO controller for input and output of a digital signal and the like, and which produces the setpoint data for control of the chopper capacity (Sxt) for the chopper capacity control circuit (Ud) described below, based on computations in which the above described lamp voltage data (Sxv) are referenced, and based on the assessment of the conditions which correspond to the state of the system at this instant. The above described setpoint data for control of the chopper capacity (Sxt) are converted by a D/A converter (Dac) into analog setpoint signals (St) for controlling the chopper capacity and are input by a terminal (Tt) into the chopper capacity control circuit (Ud).

The above described lamp voltage signal (Sv) is input by the terminal (Tv) to the chopper capacity control circuit (Ud) and the above described lamp current signal (Si) is input by the terminal (Ti) to the chopper capacity control circuit (Ud). Furthermore, the upper limit signal (Sk) of the lamp current which is fixed according to the lamp voltage (VL) and which is used to fix the allowable upper boundary value of the lamp current is produced by a circuit (Uc) for producing the upper boundary signal of the lamp current and is input by a terminal (Tk).

In the chopper capacity control circuit (Ud), the above described setpoint signal (St) for control of the chopper capacity via an amplifier or a buffer (Ad1), which is installed if necessary, and via a diode (Dd1) and furthermore the above described upper boundary signal (Sk) of the lamp current via an amplifier or a buffer (Ad2) which is installed if necessary and via a diode (Dd2) are each connected to one end of a "pull-up" resistor (Rd1), by which the setpoint signal (Sd2) is produced for chopper driving. The other end of the above described "pull-up" resistor (Rd1) is connected to a reference voltage source (Vd1) with a suitable voltage.

The above described setpoint signal (Sd2) for chopper driving is therefore a signal which is formed by selecting a smaller signal from the following two signals, i.e., from a signal (Sd3) which corresponds to the above described setpoint signal (St) for control of the chopper capacity, and from a signal (Sd4) which corresponds to the above described upper limit signal (Sk) of the lamp current.

When the above described overall controller (Xpu) in some way produces the above described setpoint signal (St)

for controlling the chopper capacity, for example, by division of a constant which corresponds to the nominal electric power by the above described lamp voltage data (Sxv), by computing the value of the lamp current (IL) for achieving the nominal electric power, by producing the setpoint signal (St) according to this value and by similar methods, even if this is unsuitable, within the above described chopper capacity control circuit (Ud) in terms of hardware the above described setpoint signal (Sd2) for chopper driving is limited such that the lamp current (IL) does not exceed the above described upper limit signal (Sk) of the lamp current.

Control via the above described A/D converter (Adc) or the microprocessor unit (Mpu) has specifically a low operating speed (or the costs rise when the speed is increased). In the case in which, for example, a situation arises in which the discharge state of the lamp has been quickly changed, therefore due to the operating delay, unsuitability of the above described setpoint signal (St) can arise for control of the chopper capacity. That one such current limitation function is furnished by hardware is also useful with respect to the protection of the lamp and the feed device.

On the other hand, the above described lamp current signal (Si) is connected via an amplifier or a buffer (Ad3), which is provided if necessary, and a diode (Dd3) to the other end of a "pull-down" resistor (Rd5), one end of which is connected to the ground (Gndx). Thus, a controllable signal (Sd5) is produced.

Furthermore, the above described lamp voltage signal (Sv) is compared by a comparator (Cmv) to the voltage of the reference voltage source (Vd2), which has a voltage corresponding to the above described no-load voltage. When the above described lamp voltage signal (Sv) is higher than the no-load voltage, a transistor (Qd1) is shifted into the OFF state or the active state. Because current is allowed to flow from a suitable voltage source (Vd3) via a resistor (Rd4) and a diode (Dd4) into the above described "pull-down" resistor (Rd5), operation is carried out such that the level of the signal (Sd5) to be controlled is increased.

Conversely, if the above described lamp voltage signal (Sv) is lower than the no-load voltage, the above described transistor (Qd1) is shifted into the ON state; this leads to a short circuit of the current from the above described voltage source (Vd3). The above described signal (Sd5) to be controlled thus corresponds to the above described lamp current signal (Si).

This is because in the above described circuit consisting of the "pull-down" resistor (Rd5), the diode (Dd3) and the diode (Dd4), a voltage is selected and forms in the "pull-down" resistor (Rd5) and is chosen according to the larger signal from the anode-side signals (Sd6) and (Sd7) of the diodes.

In the above described comparator (Cmv), by inserting positive feedback resistors (not shown in the drawings) into its output terminal and its noninverting input terminal, comparison operation can have hysteresis. In this way an unintended oscillation phenomenon can be prevented when the comparison output changes.

By this arrangement the above described signal (Sd5) to be controlled rises quickly when the above described lamp voltage signal (Sv) tries to exceed the above described no-load voltage, even if there is a state in which the output current almost stops and in which the above described lamp current signal (Si) hardly occurs. In this way the lamp voltage (VL) is always limited in terms of hardware essentially to less than or equal to the no-load voltage.

The above described setpoint signal (Sd2) for chopper driving is subjected to voltage division by a resistor (Rd2) and a resistor (Rd3) and is input into the inverting input terminal of an operational amplifier (Ade). On the other hand, the above described signal (Sd5) to be controlled is input into the noninverting input terminal of the above described operational amplifier (Ade). Since the output signal (Sd1) of the above described operational amplifier (Ade) is fed back via an integral capacitor (Cd1) and a speed increasing resistor (Rd6) to the noninverting input terminal, the above described operational amplifier (Ade) operates as an error integration circuit which integrates the difference between the divided voltage of the above described setpoint signal (Sd2) for chopper operation by the resistor (Rd2) and the resistor (Rd3) and the voltage of the above described signal (Sd5) to be controlled.

Reference letters Osc label an oscillator in which a resistor (Rd0) for determining the time constant and a capacitor (Cd0) are connected to one another, and which produces a sawtooth wave signal (Sd0) which is shown in FIG. 11 (a). This sawtooth wave signal (Sd0) and the output signal (Sd1) of the above described error integration circuit are connected to one another by a comparator (Cmg).

In a comparison, the signal (Sd8) is compared to the above described sawtooth wave signal (Sd0), the signal (Sd8) being formed by adding an offset voltage (Vd4) to the output signal (Sd1) of the above described error integration circuit.

During the interval during which the voltage of the above described sawtooth wave signal (Sd0) is higher than the voltage of the above described signal (Sd8), the above described gate driver signal (Sg) which reaches a high level is produced and output by a terminal (Tg) from the above described chopper capacity control circuit (Ud).

As was described above, the above described signal (Sd8) is formed by a remaining control deviation being added to the output signal (Sd1) of the error integration circuit. The pulse duty factor of the above described gate driver signal (Sg) is therefore provided such that it is less than or equal to a certain maximum value which is less than 100%, i.e., that it is less than or equal to the maximum pulse duty factor Dxmax even if it is assumed that the output signal (Sd1) of the above described error integration circuit is 0.

FIGS. 11 (a) and (b) show the relation between the output signal (Sd1) of the above described error integration circuit, the signal (Sd8) which is formed by a remaining control deviation being added to the latter signal, the above described sawtooth wave signal (Sd0) and the above described gate driver signal (Sg).

The above described gate driver signal (Sg) which was output by the above described feed control circuit (Fx) is input into the above described gate driver circuit (Gx). As a result, a feedback control system is completed in which the above described lamp current signal (Si) and the above described lamp voltage signal (Sv) are fed back with the operation of the switching device (Qx).

For the arrangement of the chopper capacity control circuit (Ud) which is described above using FIG. 7, the TL494 from Texas Instruments, Inc. and the like can be used as a commercial integrated circuit in which the above described operational amplifier (Ade), the oscillator (Osc), the comparator (Cmg) and the like are integrated.

In FIG. 7, the above described circuit (Uc) for producing the upper limit signal of the lamp current within the above described feed control circuit (Fx) was described as a block in which the inner arrangement is not shown. In FIG. 8, however, a simplified embodiment of the feed control circuit (Fx1) is shown in which the specific arrangement of a circuit (Uc1) for producing the upper limit signal of the lamp current is shown.

First, the suppression signal (Sa) from the overall controller (Xpu) is at a low level. Therefore the transistor (Q12) is in the OFF state. The lamp voltage signal (Sv) is input into the circuit (Uc1) for producing the upper limit signal of the lamp current by a terminal (Tf) and is compared by a comparator (Cm11) to the voltage of the reference voltage source (V12). When the above described lamp voltage signal (Sv) is higher than the voltage of the above described reference voltage source (V12), the transistor (Q11) is shifted into the ON state via a resistor (R13). Therefore the voltage with a suitable voltage value of a voltage source (V11) is divided by a resistor (R11) and a resistor (R12) and is output by a terminal (Tj) as the upper limit signal (Sk) of the lamp current with a lower level.

If conversely the above described lamp voltage signal (Sv) is lower than the voltage of the above described reference voltage source (V12), the above described transistor (Q11) is shifted into the OFF state or an active state. Here the voltage of the above described voltage source (V11) is output via the above described resistor (R11) as the upper limit signal (Sk) of the lamp current with a higher level.

The circuit (Uc1) which is shown above using FIG. 8 for producing the upper limit signal of the lamp current limits the lamp current (IL) to an essentially constant, small limit current value I1h, when the lamp voltage (VL) is higher than the limit voltage VLt1. It limits the lamp current (IL) to an essentially constant value which is greater than the above described limit current value ILh, when the lamp voltage (VL) is smaller than this limit voltage Vlt1. Here the output voltage VLt1 of the ballast circuit (Bx) which is fixed by the voltage of the above described reference voltage source (V12) is considered the limit. The voltage of the voltage source (V11) is fixed in such a way that the greater limit current value reaches the above described upper limiting value ILmax of the allowable lamp current.

In the above described comparator (Cm11), by inserting positive feedback resistors (not shown in the drawings) into its output terminal and its noninverting input terminal, comparison operation can have hysteresis. In this way an unintended oscillation phenomenon can be prevented when the comparison output changes.

By this arrangement of the ballast circuit (Bx) the output current-voltage characteristic is shown using the characteristic (F1a) between the points (P0a), (P0b), (P0c), (P11), (P12), (P13), and (P0e) in FIG. 2, when the above described setpoint signal (St) for control of the chopper capacity is set high enough for the above described limit signal (Sk) of the lamp current to be chosen for a glow discharge as the setpoint signal (Sd2) for chopper driving.

Here the voltages at the point (P12) and at the point (P13) are essentially identical to one another and have a value which is fixed by the above described limit voltage VLt1. Furthermore, the currents at the point (P11) and at the point (P12) are essentially identical and have a value which is fixed by the above described limit current value ILh. Furthermore the currents at the point (P13) and at the point (P0e) are essentially identical to one another and have a value which is fixed by the above described upper limiting value ILmax of an allowable lamp current.

FIG. 2 also shows the nominal electric power characteristic (Fp0) in the case in which the nominal electric power is kept constant, the nominal electric power of the lamp in an arc discharge being 150 W.

The reason is briefly described below for which the feed device (Ex) which has the feed control circuit (Fx1) shown in FIG. 8 as the feed control circuit (Fx) yields the characteristic shown in FIG. 2 using the characteristic (F1a).

Generally, the voltage reduction chopper circuit allows the output current to flow due to the voltage difference between the input voltage and the output voltage. The higher the output voltage becomes, the smaller therefore the output current supply capacity becomes. Conversely, the output current supply capacity becomes greater, the lower the output voltage becomes. In other words, a voltage can be output which is higher, the smaller the output current. Conversely, only a small voltage can be output, the larger the output current becomes.

The point (P0a) of the above described characteristics (F1a) corresponds to the state in which the above described no-load voltage forms. In the flat area between the points (P0a) and (P0b), as was described above, the lamp voltage signal (Sv) tries to become higher than the no-load voltage because the lamp current (IL) does not flow or is small. In this area the above described transistor (Qd1) is shifted into the OFF state or an active state, and due to the feedback control function of the chopper capacity control circuit (Ud) the pulse duty factor of the above described gate driver signal (Sg) is reduced proceeding from the above described maximum pulse duty factor Dxmax, and furthermore the lamp voltage signal (Sv) is produced according to the control such that the no-load voltage is not exceeded. In another range, i.e., in the range from which the area between the points (P0a) and (P0b) is removed, the above described transistor (Qd1) is shifted into the ON state because the lamp voltage signal (Sv) is lower than the no-load voltage.

On the other hand, in the range between points (P0b) and (P0d) of the above described characteristic (F1a) the above described signal (Sd5) to be controlled corresponds to the above described lamp current signal (Si). As was described above, the above described setpoint signal (St) for control of the chopper capacity is set high enough that the above described setpoint signal (St) for control of the chopper capacity is chosen as the setpoint signal (Sd2) for chopper driving. Since the pulse duty factor of the above described gate driver signal (Sg) cannot exceed the above described maximum pulse duty factor Dxmax, as was described above, the above described lamp current signal (Si) cannot reach the level which is fixed by the above described setpoint signal (Sd2) for chopper driving, i.e., is fixed by the above described upper limit signal (Sk) of the lamp current. Thus, a state is maintained in which the pulse duty factor of the above described gate driver signal (Sg) is fixed at the above described maximum pulse duty factor Dxmax.

From the region between point (P0b) and point (P11) of the above described characteristic (F1a) the hyperbola region between points (P0b) and (P0c) corresponds to a state in which the above described voltage reduction chopper circuit is operated from the above described switching device (Qx), the above described choke (Lx) and from the above described flywheel diode (Dx) with an intermittent mode (nonconstant mode). Furthermore, the relatively flat area which runs down and to the right between points (P0c) and (P11) corresponds to a state in which the above described voltage reduction circuit is operated with a continuous mode.

Here the intermittent mode of the above described voltage reduction chopper circuit means a state in which with respect to the choke (Lx) which controls the turning on and off of the switching device (Qx) according to the above described gate driver signal (Sg), there is an interval (Tn) during which its current (Icoil) is roughly 0, as is shown in FIG. 11 (c). Furthermore, the continuous mode means a state in which the interval (Tn) during which the current (Icoil) of the choke (Lx) is roughly 0 is not present, as is shown in FIG. 11 (d).

Generally, in the voltage reduction chopper circuit in which the pulse duty factor is fixed and which is operated with an intermittent mode, its output voltage is reduced according to the increase of the output current.

In simple approximation theory, the output voltage of a voltage reduction chopper circuit in which the pulse duty factor is fixed and which is operated with a continuous mode, regardless of the output current, is a constant value which is formed by multiplication of the dc source (Mx) by the maximum pulse duty factor DXmax. In a realistic voltage reduction chopper circuit, however, the output voltage decreases according to the increase of the output current. The area between the points (P0c) and (P11) therefore has a characteristic which runs down to the right.

As was described above, in a voltage reduction chopper circuit the output current supply capacity becomes larger, the lower the output voltage becomes. When the lamp voltage (VL) proceeding from point (P11) drops more, therefore the lamp current (IL) increases and tries to exceed the above described limit current value ILh. The signal (Sd5) to be controlled and which corresponds to the above described lamp current signal (Si), therefore, makes it possible to eliminate the difference between itself and the divided voltage of the above described setpoint signal (Sd2) for chopper driving which corresponds to the above described upper limit signal (Sk) of the lamp current by the resistor (Rd2) and the resistor (Rd3). In this way the output signal (Sd1) of the error integration circuit is increased. By reducing the pulse duty factor of the above described gate driver signal (Sg) the lamp current (IL) is maintained at the above described limit current value ILh. The area which forms between points (P11) and (P12) of the above described characteristic (F1a) and in which the lamp current (IL) is constant is formed in this way.

If proceeding from point (P12) the lamp voltage (VL) drops more and is less than or equal to the above described limit current value of ILh, the lamp current (IL) is maintained at the above described upper limiting value ILmax of the allowable lamp current which is greater than the above described limit current value ILh, as was described above. The area which forms between points (P13) and (P0e) of the above described characteristic (F1a) and in which the lamp current (IL) is constant is formed in this way.

Therefore, the above described upper limit signal (Sk) of the lamp current with a lower level can be fixed such that the point (P11) does not exceed the current-voltage characteristic (Fp1) which corresponds to a constant electric power which is twice as high as the nominal electric power of the lamp so that the electric power supplied to the above described discharge lamp is fixed at less than or equal to twice as high as the nominal electric power of the above described discharge lamp. Furthermore, for the same purpose, the voltage of the above described reference voltage source (V12) can be fixed such that for the above described upper limit signal (Sk) of the lamp current with the higher level, i.e., at the above described upper limiting value ILmax of the allowable lamp current, the point (P13) does not exceed the current-voltage characteristic (Fp1) which corresponds to a constant electric power which is twice as high as the nominal electric power of the lamp.

Figure 8:
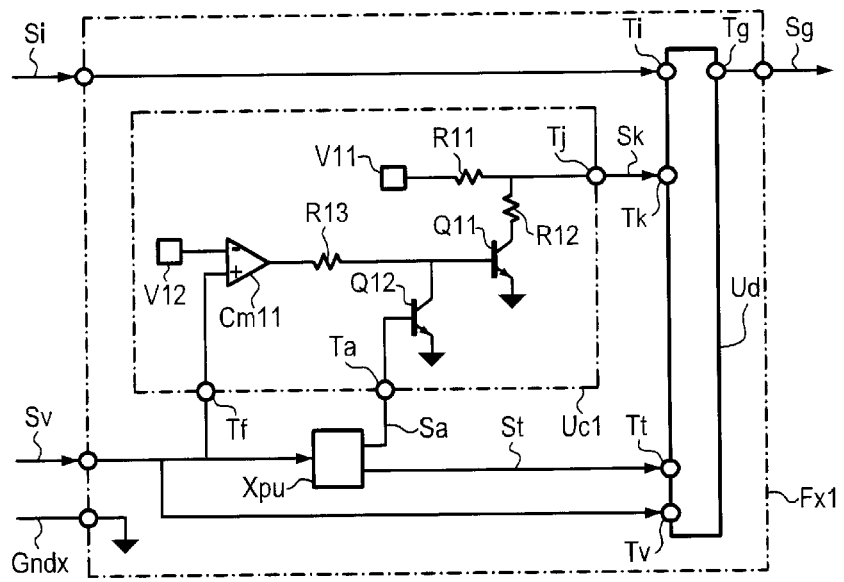
FIG. 8 shows a schematic of an example of the arrangement of a feed control circuit according to the first embodiment of a feed device of a light source device in accordance with the invention.

This design of the feed device, as was already described in the advantages of the invention, in the feed device in accordance with the invention with the arrangements which are shown in FIG. 1, FIG. 7 and FIG. 8 and which implements the output current-voltage characteristic of a glow discharge shown in FIG. 2, fixes the electric power which goes beyond a certain value in a glow discharge at less than or equal to twice as high as the nominal electric power of the lamp. Therefore, the above described disadvantage of formation of blackening on the inside of the bulb glass in a glow discharge can be eliminated and the degree of maintenance of illuminance can be increased.

The respective process of the light source device in accordance with the invention which is described in FIG. 1 and which has the feed control circuit (Fx1) described in FIG. 8 as the feed control circuit (Fx) is briefly described from starting, during starting, in a glow discharge, in a transition to an arc discharge, and with convergence into an arc discharge in the steady state, as are important points in control in practice.

When this light source device is started, for a glow discharge in the overall controller (Xpu) the above described setpoint signal (St) for control of the chopper capacity is set high enough that the above described upper limit signal (Sk) of the lamp current is selected as the setpoint signal (Sd2) for chopper operation, as was described above. Furthermore, here the output current-voltage characteristic is shifted into the state described using the characteristic (F1a) shown in FIG. 2.

At this instant, the discharge lamp (Ld) is turned off and the lamp current (IL) does not flow. Thus a state is formed in which the no-load voltage is formed, i.e., a state which corresponds to the point (P0a).

By operation of the starter (Ui) between the above described electrodes (E1, E2), a high voltage is applied, an insulation breakdown is produced, and a glow discharge is started, as was described above.

The state of the system for the duration of the glow discharge remains a while at some point in the area between the points (P0c) and (P12) on the characteristics (F1a) in FIG. 2. The form of the discharge passes into an arc discharge when the electrode temperature increases sufficiently.

As was described above, the lamp voltage (VL) drops quickly when the lamp passes into an arc discharge. The overall controller (Xpu) which determines the lamp voltage signal (Sv) via the A/D converter (Adc) can therefore determine the rapid decrease of the lamp voltage (VL).

Or the transition of the lamp into an arc discharge can be determined by waiting for a certain time characteristic and by subsequent determination of the rapid drop of the lamp voltage (VL). Thus, it is possible to prepare for the case of another transition into an arc discharge after returning to a glow discharge after the transition of the lamp into an arc discharge or, for the case of a transition into an arc discharge, after several repetitions of the above described process.

In the determination of the transition of the lamp into an arc discharge the overall controller (Xpu) essentially regularly determines the lamp voltage (VL), divides the adjusted setpoint electric power by the determined lamp voltage (VL), computes the setpoint current which is considered the setpoint signal (St) for control of the chopper capacity, and starts a recurring process, instead of carrying out the previous operation in which for choosing the above described upper limit signal (Sk) of the lamp current as the setpoint signal (Sd2) for chopper driving for a glow discharge, the above described setpoint signal (St) for control of the chopper capacity is set high enough.

As was described above, during the initial interval (T31) of the arc discharge the temperature of the lamp is not high enough. Therefore the setpoint current cannot be reached because the computed setpoint current exceeds the above described upper limiting value ILmax of an allowable lamp current. But over time the lamp voltage rises, by which the computed setpoint current reaches a value which is less than or equal to the above described upper limiting value ILmax of the allowable lamp current. This makes it possible to supply the adjusted setpoint electric power to the lamp. Afterwards the state of the light source device is changed along the nominal electric power characteristic (Fp0) in FIG. 2 and reaches a steady state (T33) which is retained as was described above.

In FIG. 2, the characteristic (F1a) of the glow discharge in the vicinity of the point (P12) is positioned underneath the nominal electric power characteristic (Fp0) of the arc discharge. As was described above, the above described setpoint signal (Sd2) for chopper drive of the above described chopper capacity control circuit (Ud) is a signal which is formed by selecting a smaller signal from the following two signals, i.e., from a signal (Sd3) which corresponds to the above described setpoint signal (St) for control of the chopper capacity, and from a signal (Sd4) which corresponds to the above described upper limit signal (Sk) of the lamp current. Under the condition that the characteristic (F1a) of the glow discharge is positioned underneath the nominal electric power characteristic (Fp0) of the arc discharge, the characteristic (F1a) of the glow discharge seems more preferred than the nominal electric power characteristic (Fp0) of the arc discharge, regardless of the fact that the discharge is an arc discharge.

To prevent this disadvantage from arising, the above described overall controller (Xpu) at the above described instant of determination of the transition of the lamp into the arc discharge shifts the above described suppression signal (Sa) to a high level and the above described transistor (Q12) into the ON state and prevents the above described transistor (Q11) from being shifted into the ON state. As a result, in the case in which the lamp voltage (VL) is higher than the above described limit voltage VLt1, the appearance of the function of limitation of the lamp current (IL) to Vlt1 can be prohibited.

In the case in which the above described condition that the characteristic of the glow discharge is positioned underneath the characteristic of the arc discharge is not present, of course the practical use of the above described function of preventing the operation of the above described transistor (Q11) by the above described transistor (Q12) can be omitted.

A second embodiment according to the invention is described below. FIG. 9 shows the arrangement of the feed control circuit (Fx2) in a simplified representation, the specific arrangement of the circuit (Uc) for producing the upper limit signal of the lamp current in the feed control circuit (Fx) described using FIG. 7 with a circuit (Uc2) for producing the upper limit signal of the lamp current being shown.

The lamp voltage signal (Sv) is input by the terminal (Tf) to the circuit (Uc2) for producing the upper limit signal of the lamp current and is compared by a comparator (Cm21) to the voltage of the reference voltage source (V22). When the voltage of the above described lamp voltage signal (Sv) is higher than the voltage of the above described reference voltage source (V22), the transistor (Q21) is shifted into an ON state, by which the resistor (R25) is short circuited. The value of the resistor which is connected by the noninverting input terminal of the operational amplifier (A22) to the ground is therefore a smaller value which is formed only by the resistor (R24).

If, conversely, the voltage of the above described lamp voltage signal (Sv) is lower than the voltage of the above described reference voltage source (V22), the above described transistor (Q21) is shifted into the OFF state or into an active state. The resistor (R25) is not short circuited in this case. The value of the resistor which is connected by the noninverting input terminal of the operational amplifier (A22) to the ground is therefore a larger value which is formed only by the sum of resistor (R24) and resistor (R25).

In the above described comparator (Cm21), by inserting positive feedback resistors (not shown in the drawings) into its output terminal and its noninverting input terminal, comparison operation can have hysteresis. In this way, an unintended oscillation phenomenon can be prevented when the comparison output changes.

A reference voltage source (V21) with a suitable voltage value is connected via a resistor (R23) to the above described noninverting input terminal of the above described operational amplifier (A22). On the other hand, the above described lamp voltage signal (Sv) is input via an amplifier or a buffer (A21) which is arranged if necessary and via a resistor (R21) to the inverting input terminal of the above described operational amplifier (A22).

The output voltage of the above described operational amplifier (A22) is fed back via a resistor (R22) to the above described inverting input terminal of the above described operational amplifier (A22). As a result, the above described operational amplifier (A22) works as a differential amplifier circuit.

Here, the output voltage Eo of the above described operational amplifier (A22) is represented by the following formula 1:

$$Eo = A + B \cdot F(Ei) - C \cdot EI \qquad \text{(Formula 1)}$$

Here, Ei is the voltage of the above described lamp voltage signal (Sv), A, B, and C are positive constants and F (Ei) is a function of Ei. When the above described transistor (Q21) is in the ON state, F is 0. When the above described transistor (Q21) is in the OFF state, F is 1.

The values of the above described constants A, B and C are computed based on the resistance values of the above described resistors (R21), (R22), (R23), (R24), and (R25), based on the gain of the above described amplifier or the buffer (A21) and based on the voltage value of the above described reference voltage source (V21).

The output voltage Eo of the above described operational amplifier (A22) is output by the terminal (Tj) via the resistor (R26) and is input to the above described chopper capacity control circuit (Ud) as the upper limit signal (Sk) of the lamp current. As becomes apparent from FIG. 1, the above described upper limit signal (Sk) of the lamp current becomes linearly smaller, the higher the lamp voltage (VL) in the region in which the above described transistor (Q21) is in the ON state, and in the region in which the transistor (Q21) is in the OFF state.

The output voltage of the above described ballast circuit (Bx), i.e., the lamp voltage (VL), is fixed by the function of the above described comparator (CmV) such that it ultimately does not exceed the above described no-load voltage. It therefore becomes apparent that under the condition that the above described transistor (Q21) is in the ON state, the above described upper limit signal (Sk) of the lamp current must limit the lamp current (IL) to 0 A, when the lamp voltage (VL) reaches a suitable voltage of greater than or equal to the above described no-load voltage.

In the case in which the upper limit signal (Sk) of the lamp current limits the lamp current (IL) to 0 A when the lamp voltage (VL), under the condition that the above described transistor (Q21) is in the ON state, is the above described no-load voltage, the switching components described above using FIG. 7, such as the comparator (Cmv), the transistor (Qd1) and the like which prevent the lamp voltage (VL) from exceeding the above described no-load voltage can be omitted.

Since it is necessary for the output current of the above described ballast circuit (Bx), i.e., the lamp current (IL), to be fixed in such a way that it does not exceed the above described upper limiting value ILmax of an allowable lamp current, it becomes apparent that the above described upper limit signal (Sk) of the lamp current must limit the lamp current (IL) to the upper limiting value ILmax of an allowable lamp current when, under the condition that the above described transistor (Q21) is in the OFF state, the lamp voltage (VL) is roughly 0 V (i.e., it is a voltage which corresponds to a low discharge voltage during the above described initial interval (T31) of arc discharge. There is no great difference when it is labeled 0 V in considering the output current-voltage characteristic).

In the circuit (Uc2) which is described above using FIG. 9 for producing the upper limit signal of the lamp current, a limit voltage VLt2 at the output voltage of the ballast circuit (Bx) which is determined by the voltage of the above described reference voltage source (V22) is called the threshold value, and the lamp current (IL) is increasingly linearly limited according to the drop in the lamp voltage (VL) such that the lamp voltage (VL) does not exceed the above described no-load voltage, in the case in which the lamp voltage (VL) is higher than this limit voltage VLt2. Furthermore, for the circuit (Uc2) the lamp current (IL) is increasingly linearly limited according to the decrease of the lamp voltage (VL) such that the lamp current (IL) does not exceed the upper limiting value ILmax of an allowable lamp current in the case in which the lamp voltage (VL) is lower than this limit voltage VLt2.

However, it is necessary for the suppression signal (Sa) from the overall controller (Xpu) to be at a low level, for the transistor (Q22) to be shifted into the OFF state, and for the transistor (Q23) to be shifted by means of a resistor (R27) into the OFF state so that the output voltage Eo of the above described operational amplifier (A22) is output as the upper limit signal (Sk) of the lamp current.

When the suppression signal (Sa) from the overall controller (Xpu) is at a high level, the transistor (Q22) is shifted into the ON state. Furthermore, the above described transistor (Q23) is shifted via the resistor (R28) into the ON state. The above described upper limit signal (Sk) of the lamp current is therefore fixed independently of the output voltage Eo of the above described operational amplifier (A22) at a voltage which is essentially equal to the reference voltage source (V23). The voltage of the reference voltage source (V23) is determined such that this voltage value corresponds to the above described upper limiting value ILmax of the allowable lamp current.

By this arrangement of the ballast circuit (Bx) the output current-voltage characteristic is shown in FIG. 3 using the characteristic (F2a) between the points (P2a), (P21), (P22) and (P2f), when the above described setpoint signal (St) for control of the chopper capacity is set high enough for the above described upper limit signal (Sk) of the lamp current to be selected for a glow discharge as the setpoint signal (Sd2) for chopper driving. Here, the voltages at the point (P21) and the point (P22) are essentially identical to one another and are at a value which is fixed by the above described limit voltage VLt1.

Therefore, the constants A, B, and C of the above described formula 1 can be fixed such that the characteristic (F2a) does not exceed the current-voltage characteristic (Fp1) which corresponds to a constant electric power which is twice as high as the nominal electric power of the lamp so that the electric power supplied to the above described discharge lamp is fixed at less than or equal to twice as high as the nominal electric power of the above described discharge lamp.

As the region between points (P0b) and (P11) was described above in connection with FIG. 2, the output current-voltage characteristic in FIG. 3, like the characteristic (F2a) and the like, is limited as a function of the upper limit characteristic (Fdw) of the lamp voltage (VL) by the power supply capacity, the upper limit characteristic (Fdw) being caused by a feature with respect to the operating state with an intermittent mode and by a feature with respect to the operating state with a continuous mode in the voltage reduction chopper circuit at which the pulse duty factor of the above described gate driver signal (Sg) is the above described maximum pulse duty factor DXmax. But this is not a problem.

Figure 9:
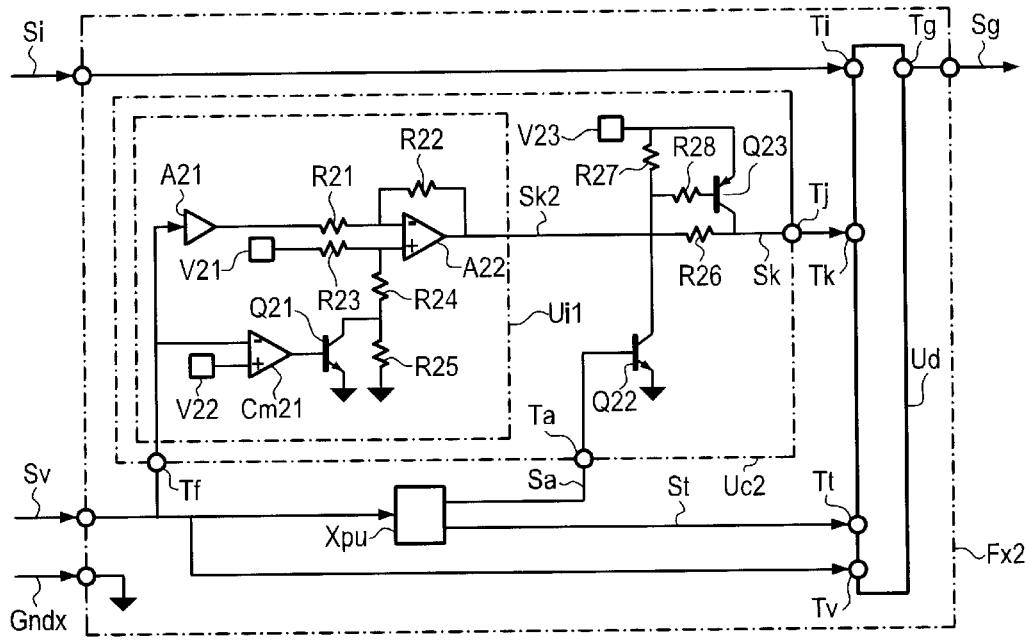
FIG. 9 shows a schematic of an example of the arrangement of a feed control circuit according to the second embodiment of a feed device of a light source device in accordance with the invention.

This design of the feed device, as was already described in the advantages of the invention, in the feed device in accordance with the invention with the arrangements which are described in FIG. 1, FIG. 7 and FIG. 9 and which implements the output current-voltage characteristic of a glow discharge shown in FIG. 3, fixes the electric power which goes beyond a certain value in a glow discharge at less than or equal to twice as high as the nominal electric power of the lamp. Therefore the above described disadvantage of formation of blackening on the inside of the bulb glass in a glow discharge can be eliminated and the degree of maintenance of illuminance can be increased.

Also, when this light source device is being started, for a glow discharge in the overall controller (Xpu), the above described setpoint signal (St) for control of the chopper capacity is set high enough for the above described upper limit signal (Sk) of the lamp current to be selected as the setpoint signal (Sd2) for chopper driving, as in the above described first embodiment of the light source device. Furthermore, the output current-voltage characteristic is shifted into the state described using the characteristic (F2a) described in FIG. 3. Or, the above described setpoint signal (St) for control of the chopper capacity can be set such that the above described upper limit signal (Sk) of the lamp current corresponds to the above described upper limiting value ILmax of the allowable lamp current.

The above described overall controller (Xpu) at the instant of determination of the transition of the lamp into an arc discharge shifts the above described suppression signal (Sa) to a high level and thus the above described transistor (Q22) and the above described transistor (Q23) into the ON state, as in the above described first embodiment of the light source device. Thus, the above described upper limit signal (Sk) of the lamp current corresponds to the above described upper limiting value ILmax of the allowable lamp current.

This measure makes it possible, after the transition into the arc discharge, to separate from the output current-voltage characteristic shown using the characteristic (F2a) and pass into the nominal electric power characteristic (Fp0) along the nominal electric power characteristic between points (P2e) and (P2f). Thus the nominal electric power characteristic (Fp0) can be reached more promptly than by moving along the characteristic (F2a).

This neutralization of the output current-voltage characteristic of the glow discharge is unnecessary in the case in which it is not necessary to promptly reach the nominal electric power characteristic (Fp0). But it is necessary in the case in which the condition is present that in the ordinary region of the nominal electric power characteristic (Fp0) of the arc discharge (i.e., in the region of the arc discharge in the case of use as a light source, from which a region with dark emission during starting and immediately after starting is removed) the output current-voltage characteristic of the glow discharge is positioned more to the bottom.

Since the above described characteristic (F2a) in FIG. 3 is located in the ordinary region above the above described nominal electric power characteristic (Fp0), it is possible to omit the above described function of neutralization of the output current-voltage characteristic of the glow discharge. But if the point (P21) is more to the bottom or more to the left and crosses the above described nominal electric power characteristic (Fp0), the above described function of neutralization of the output current-voltage characteristic of the glow discharge is necessary.

Figure 10:
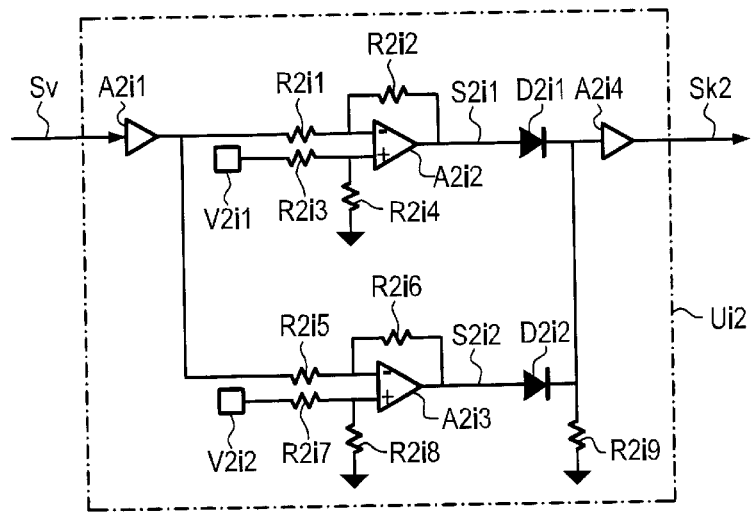
FIG. 10 shows a schematic of another example of the arrangement of part of a feed control circuit according to the second embodiment of a feed device of a light source device in accordance with the invention.

The switching block (Ui1) described above using FIG. 9 can be replaced by the switching block (Ui2) described in FIG. 10 and thus a greater improvement can be achieved.

The above described lamp voltage signal (Sv) is input via an amplifier or buffer (A2i1) which is installed if necessary, to a differential amplifier circuit consisting of an operational amplifier (A2i2), a reference voltage source (V2i1), a resistor (R2i1), a resistor (R2i2), a resistor (R2i3) and a resistor (R2i4), and to a differential amplifier circuit consisting of an operational amplifier (A2i3), a reference voltage source (V2i2), a resistor (R2i5), a resistor (R2i6), a resistor (R2i7) and a resistor (R2i8).

The arrangement of these differential amplifier circuits corresponds to an arrangement which is formed by removing the resistor (R25) and the transistor (Q21) from the differential amplifier circuit described using FIG. 9 comprised of an operational amplifier (A22), the reference voltage source (V21), the resistor (R21), the resistor (R22), the resistor (R23,) the resistor (R24), the resistor (R25) and the transistor (Q21). The voltages Eo1 and Eo2 of the signals (S2i1) and (S2i2) as outputs of these differential amplifier circuits are shown by the following formulas:

$$Eo1 = A1 - C1 \cdot Ei \quad \text{(Formula 2)}$$

$$Eo2 = A2 - C2 \cdot Ei \quad \text{(Formula 3)}$$

Here, Ei is the voltage of the above described lamp voltage signal (Sv), A1 and C1 the positive constants which are computed based on the resistance values of the above described resistors (R2i1), (R2i2), (R2i3), and (R2i4), based on the gain of the above described amplifier or the buffer (A2i1) and based on the voltage value of the above described reference voltage source (V2i1). Furthermore, the positive constants A2 and C2 are computed based on the resistance values of the above described resistors (R2i5), (R2i6), (R2i7), and (R2i8), based on the gain of the above described amplifier or the buffer (A2i1) and based on the voltage value of the above described reference voltage source (V2i2).

A greater voltage is selected from the voltages of the signals (S2i1) and (S2i2) by a diode (D2i1) and a diode (D2i2) and appears at the resistor (R2i9). The latter is therefore connected to a resistor (R26) via an amplifier or a buffer (A2i4) which is installed if necessary, instead of a signal (SK2) from the operational amplifier (A22) in FIG. 9.

As becomes apparent from formulas 2 and 3, the voltages Eo1 and Eo2 of the signals (S2i1) and (S2i2) become linearly smaller, the higher the lamp voltage (VL) becomes. From them a greater voltage is selected and acts as the upper limit signal (Sk) of the lamp current. The output current-voltage characteristic is therefore shown in FIG. 4 using the characteristic (F2e) between the points (P2a), (P26), (P27) and (P2e), when the above described setpoint signal (St) for control of the chopper capacity is set according to the above described upper limiting value ILmax of the allowable lamp current so that the above described upper limit signal (Sk) of the lamp current is selected for a glow discharge as the setpoint signal (sd2) for chopper driving.

The region with the nominal current between points (P27) and (P2e) is formed here by the above described setpoint signal (St) for control of the chopper capacity being set according to the above described upper limiting value ILmax of the allowable lamp current.

Therefore, the constants A1, A2, C1 and C2 of the above described formulas 2 and 3 can be fixed such that the characteristic (F2e) does not exceed the current-voltage characteristic (Fp1) which corresponds to a constant electric power which is twice as high as the nominal electric power of the lamp so that the electric power supplied to the above described discharge lamp is fixed at less than or equal to twice as high as the nominal electric power of the above described discharge lamp.

Figure 4:
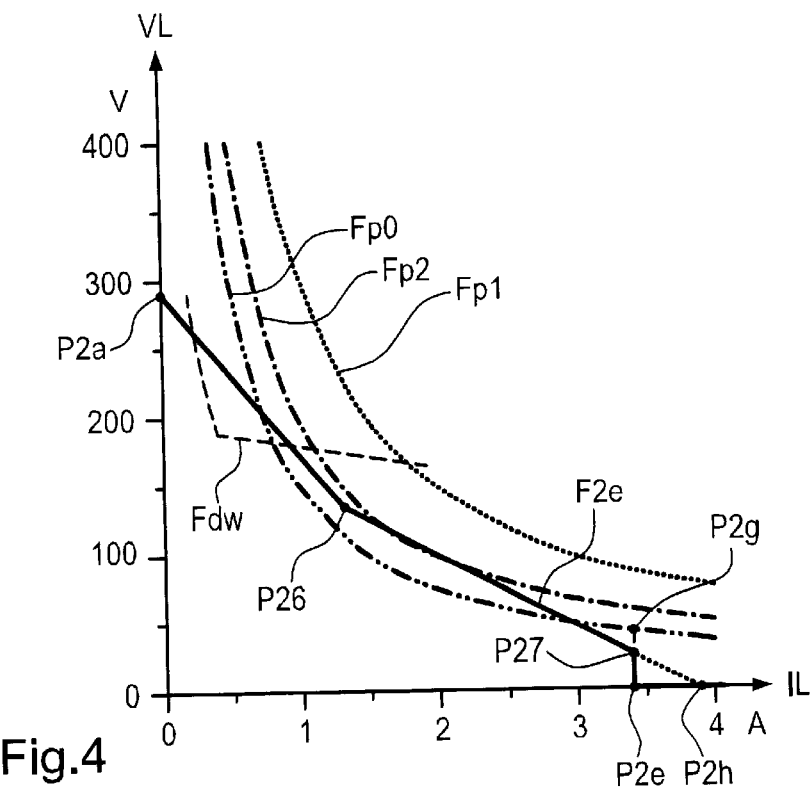
FIG. 4 shows a schematic of another example of the output current-voltage characteristic according to a second embodiment of a feed device of a light source device in accordance with the invention.

This design of the feed device, as was already described in the advantages of the invention, in the feed device in accordance with the invention with the arrangement of the switching block (Ui2) which is described in FIG. 10 and which implements the output current-voltage characteristic of a glow discharge shown in FIG. 4, fixes the electric power which goes beyond a certain value in a glow discharge at less than or equal to twice as high as the nominal electric power of the lamp. Therefore, the above described disadvantage of formation of blackening on the inside of the bulb glass in a glow discharge can be eliminated and the degree of maintenance of illuminance can be increased.

The region between the points (P21) and (P22) in the characteristic (F2a) described above using FIG. 3 is formed as a discontinuous jump by the operation of the comparator (Cm21) described using FIG. 9.

Normally, the lamp voltage (VL) drops quickly via a transition from a glow discharge into an arc discharge and thus exceeds the above described limit voltage VLt2. Therefore there is no disadvantage. But in the case of a lamp in which the lamp voltage (VL) drops relatively slowly from one side which is higher than the above described limit voltage VLt2 to the side which is lower than VLt2 and thus exceeds VLt2, immediately after exceeding takes place, the attempt is made to rapidly increase the lamp current (IL). The lamp voltage (VL) is increased by the voltage drop by the current and returns again to the side with the higher voltage; this is repeated.

Since the characteristic (F2e) in FIG. 4 does not have such a discontinuous jump, the repeating process of increasing and decreasing the lamp voltage (VL) does not often occur.

Figure 12:
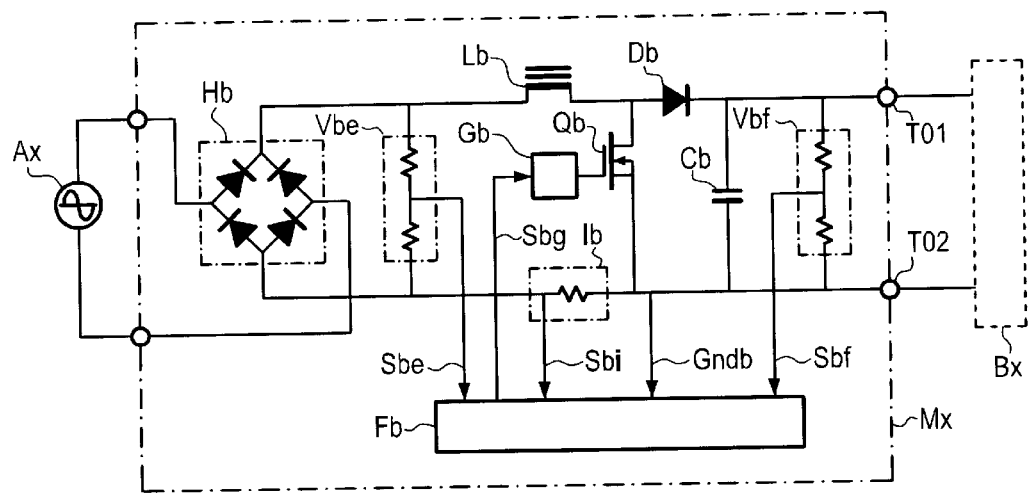
FIG. 12 shows a schematic of an example of the arrangement of a dc source of a feed device of a light source device in accordance with the invention.
Figure 11A:
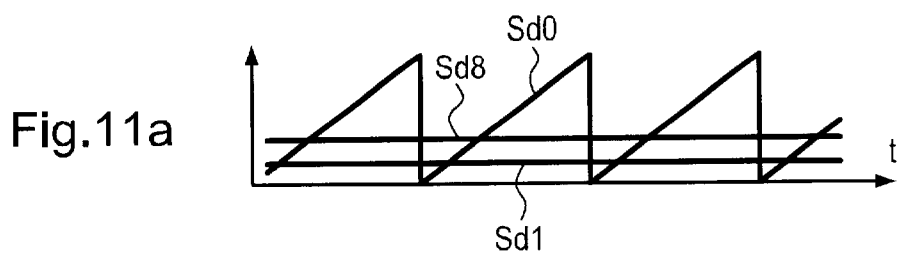
FIGS. 11(a)–11(d) each show a schematic of the operation of a voltage reduction chopper circuit of a feed device of a light source device in accordance with the invention.
Figure 11B:
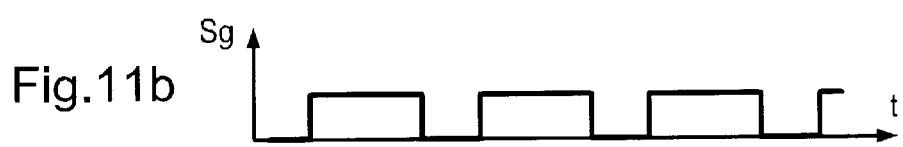
Figure 11C:
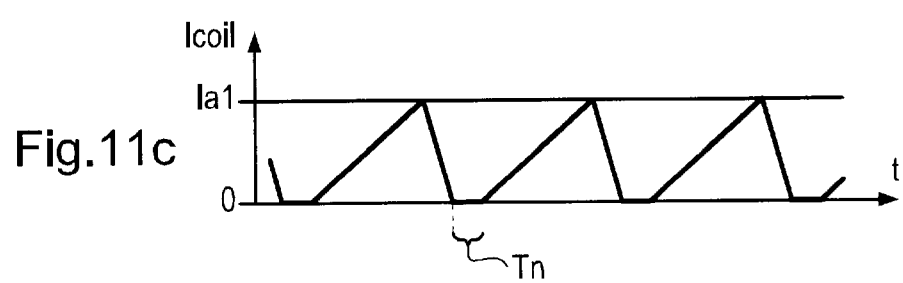
Figure 11D:
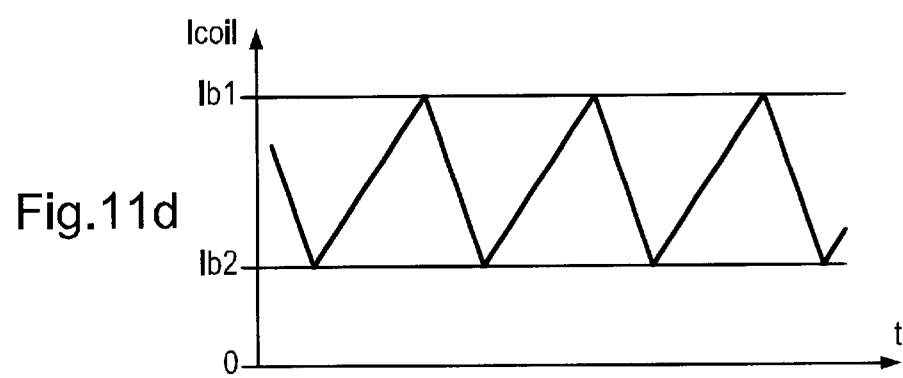

The a third embodiment of the invention is below. FIG. 12 shows a simplified example of the dc source (Mx), which is shown in FIG. 1, and which has an active filter arrangement for improving the power factor of the voltage increasing chopper type.

Here, the line power source (Ax) is connected to a diode bridge (Hb). Bidirectional rectification of the current thereof produces a bidirectionally rectified voltage which has a waveform of the absolute value of a sine curve. This voltage is applied to the voltage increasing chopper circuit which consists mainly of a choke (Lb), a switching device (Qb), such as a FET or the like, a diode (Db) and a smoothing capacitor (Cb).

The above described switching device (Qb) is driven by a gate driver circuit (Gb) which follows a gate driver signal (Sbg). The connection of the above described choke (Lb) to the above described bidirectionally rectified voltage and its disconnection are repeated by an essentially periodic repetition of turning on and off.

During the interval during which the above described switching device (Qb) is in the ON state, and in which the above described choke (Lb) is connected to the above described bidirectionally rectified voltage, the above described choke (Lb) stores energy magnetically by increasing the current of the above described choke (Lb). During the interval during which the above described switching device (Qb) is in the OFF state, and in which the connection of the above described choke (Lb) to the above described bidirectionally rectified voltage is broken, the energy stored in the above described choke (Lb) is released as current via the above described diode (Db), charged in the above described smoothing capacitor (Cb), and supplied to the above described ballast circuit (Bx) which is a load via a terminal (T01) and a terminal (T02).

The signal (Sbe) of the rectified voltage which was produced by a means (Vbe) for determining the rectified voltage, an output signal (Sbf) which was produced by a means (Vbf) for determining the output voltage, and an output current signal (Sbi) which was produced by a means (Ib) for determining the output current are input to the dc source control circuit (Fb) for producing the above described gate driver signal (Sbg).

The above described means (Vbe) for determining the rectified voltage and the above described means (Vbf) for determining the output voltage can be easily implemented using a partial pressure resistor and the above described means (Ib) for determining the output current can be easily implemented using a shunt resistor.

Figure 13:
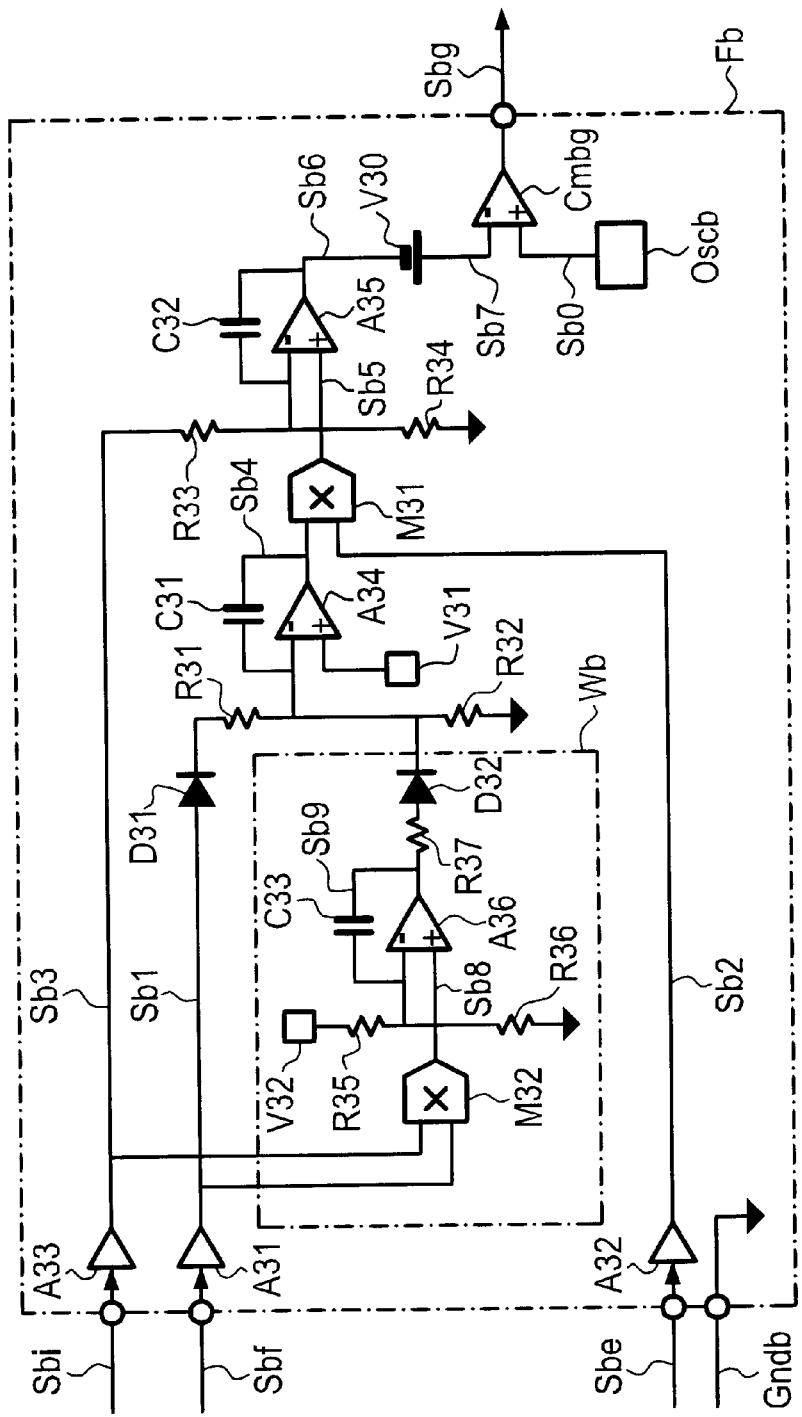
FIG. 13 shows a schematic of an example of the arrangement of a dc source control circuit of a feed device of the light source device in accordance with the invention.

FIG. 13 shows a simplified example of the arrangement of the above described dc source control circuit (Fb).

Reference designation Sb1 is a signal which was input via an amplifier or a buffer (A31) which is installed if necessary and which corresponds to the above described output voltage signal (Sbf). The signal (Sb1) is subjected to voltage division via a diode (D31) by a resistor (R31) and a resistor (R32) and is connected to the inverting input terminal of the operational amplifier (A34). Furthermore, a reference voltage source (V31) with a suitable voltage for fixing the setpoint of the output voltage of the above described dc source (Mx) is connected to the noninverting input terminal of the operational amplifier (A34).

Since the output signal (Sd1) of the above described operational amplifier (A34) is fed back via an integral capacitor (C31) with an inverting input terminal, the above described operational amplifier (A34) operates as an error integration circuit which integrates the difference between the setpoint of the output voltage which is fixed by the above described reference voltage source (V31), and the voltage of the signal (Sb1) which corresponds to the output voltage signal (Sbf). Thus the output voltage error integration signal (Sb4) is produced.

Reference designation Sb2 is a signal which was input via an amplifier or a buffer (A32) which is installed if necessary and which corresponds to the above described signal (Sbe) of the rectified voltage. The signal (Sb2) together with the above described voltage error integration signal (Sb4) is input to a multiplying device (M31). Multiplying these two signals yields a current setpoint signal (Sb5). When multiplied, for simple matching of the signal level the above described signal (Sb2) and the above described output voltage error integration signal (Sb4) is normalized by the average of the above described signal (Sb2).

Reference designation (Sb3) is a signal which was input via an amplifier or a buffer (A33), which is installed if necessary, as in polarity matching or the like, and which corresponds to the above described output current signal (Sbi). The signal (Sb3) is subjected to voltage division by a resistor (R33) and a resistor (R34) and is connected to the inverting input terminal of the operational amplifier (A35). Furthermore, the above described current setpoint signal (Sb5) is connected to the noninverting input terminal of the operational amplifier (A35).

Since the output of the above described operational amplifier (A35) is fed back via an integral capacitor (C32) with an inverting input terminal, the above described operational amplifier (A35) operates as an error integration circuit which integrates the difference between the setpoint of the output current which is fixed by the current setpoint signal (Sb5) and the voltage of the signal (Sb3) which corresponds to the output current signal (Sbi). Thus, the output current error integration signal (Sb6) is produced.

Reference letters Oscb are an oscillator which produces a sawtooth wave signal (Sb0), as in the case of the oscillator (Osc) described above using FIG. 11. This sawtooth wave signal (Sb0) and the above described output current error integration signal (Sb6) are connected to one another by a comparator (Cmbg).

In a comparison, as in the above described comparison by means of the comparator (Cmg), the signal (Sb7) is compared to the above described sawtooth wave signal (Sb0), the signal (Sb7) being formed by adding an offset voltage (V30) to the above described output current error integration signal (Sb6).

During the interval during which the voltage of the above described sawtooth wave signal (Sb0) is higher than the voltage of the above described signal (Sb7), the above described gate driver signal (Sbg) which reaches a high level is produced and output by the above described dc source control circuit (Fb).

As described above, the above described signal (Sb7) is formed by a remaining control deviation being added to the above described output current error integration signal (Sb6). The pulse duty factor of the above described gate driver signal (Sbg) is therefore provided such that it is less than or equal to a certain maximum value which is less than 100%, i.e., that it is less than or equal to the maximum pulse duty factor even if it is assumed that the output current error integration signal (Sb6) is 0.

If a case is imagined in which the signal (Sb9) of the output power limiter circuit (Wb) described below is 0 V, and in which therefore the above described signal (Sb9) is separated by a diode (D32) from the voltage division circuit consisting of the above described resistors (R31) and (R32), the dc source (Mx) due to the above described arrangement of the dc source control circuit (Fb) works as a power source of the active filter type for improving the power factor.

As described above, the circuit is driven by the above described output voltage error integration signal (Sb4) which is formed by integrating the difference between the setpoint of the output voltage which is fixed by the above described reference voltage source (V31), and the above described output voltage signal (Sbf) (a signal corresponding to it) by the error integration circuit which consists of the above described operational amplifier (A34) and the like. The output voltage of the dc source (Mx) is subjected to feedback control such that the difference from the setpoint always becomes small and acts as a stabilized power source.

The above described output voltage error integration signal (Sb4) using the above described multiplying device (M31) produces the above described current setpoint signal (Sb5) with the waveform of the bidirectionally rectified voltage which was modulated by the above described signal (Sbe) of the rectified voltage (a signal which corresponds to this). The circuit is driven by the above described output current error integration signal (Sb6) which is formed by integrating the difference between the current setpoint signal (Sb5) and the output current signal (Sbi) (a signal corresponding to it) by the error integration circuit which consists of the above described operational amplifier (A35) and the like. The output current signal (Sbi) is subjected to feedback control such that the difference to the setpoint always becomes small. As a result, the waveform of the current which is supplied from the line power source (Ax) to the dc source (Mx) becomes similar to the voltage of the line power source (Ax). The harmonic components are suppressed and the power factor is improved.

For the arrangement of the dc source control circuit (Fb) which is described above using FIG. 13, the UC3854 from Texas Instruments, Inc. and the like can be used as a commercial integrated circuit in which the above described operational amplifier (A34), the multiplying device (M31), the operational amplifier (A35), the oscillator (Oscb), the comparator (Cmg) and the like are integrated.

The operation of the output power limiter circuit (Wb) is described below, in which the signal (Sb1) corresponding to the output voltage of the dc source (Mx) and the signal (Sb3) corresponding to the output current of the dc source (Mx) are input to the multiplying device (M32), and the signal (Sb8) corresponding to the output voltage of the dc source (Mx) is produced. This signal is connected to the noninverting input terminal of the operational amplifier (A36). The voltage of the reference voltage source (V32) with a suitable voltage is subjected to voltage division by a resistor (R35) and a resistor (R36) and connected to the inverting input terminal of the operational amplifier (A36).

The output of the above described operational amplifier (A36) is fed back via an integral capacitor (C33) with an inverting input terminal. The operational amplifier (A36) operates therefore as an error integration circuit which integrates the difference between the upper limiting value of the output voltage which is fixed by the reference voltage source (V32), and the voltage of the signal (Sb8) which corresponds to the output voltage and produces the voltage error integration signal (Sb9).

Assuming that the output voltage of the operational amplifier (A36) does not become negative, the voltage of the above described reference voltage source (V32) is set such that in the case in which the increased power of the above described ballast circuit (Bx) as the load of the dc source (Mx) is roughly the nominal electric power or less than or equal to the nominal electric power, as in the off state of the lamp or in the state of an arc discharge of the lamp, the above described signal (Sb9) at 0 V is saturated.

If here the output voltage increases and tries to exceed the upper limiting value of the output voltage which is fixed by the voltage of the reference voltage source (V32), the signal (Sb9) increases. Therefore, an excess current is supplied to the above described resistor (R32) via a resistor (R37) and the above described diode (D32).

The error integration circuit of the output voltage of the dc source (Mx) responds by the operational amplifier (A34) such that the output voltage of the dc source (Mx) has become overly large compared to the setpoint voltage. In this way, the output voltage of the dc source (Mx) decreases more than in the normal case.

As a result, the above described signal (Sb8) which corresponds to the output power of the dc source (Mx) decreases and feedback control is accomplished such that the value is maintained in the vicinity of the upper limiting value of the output power which is fixed by the voltage of the reference voltage source (V32).

Figure 5:
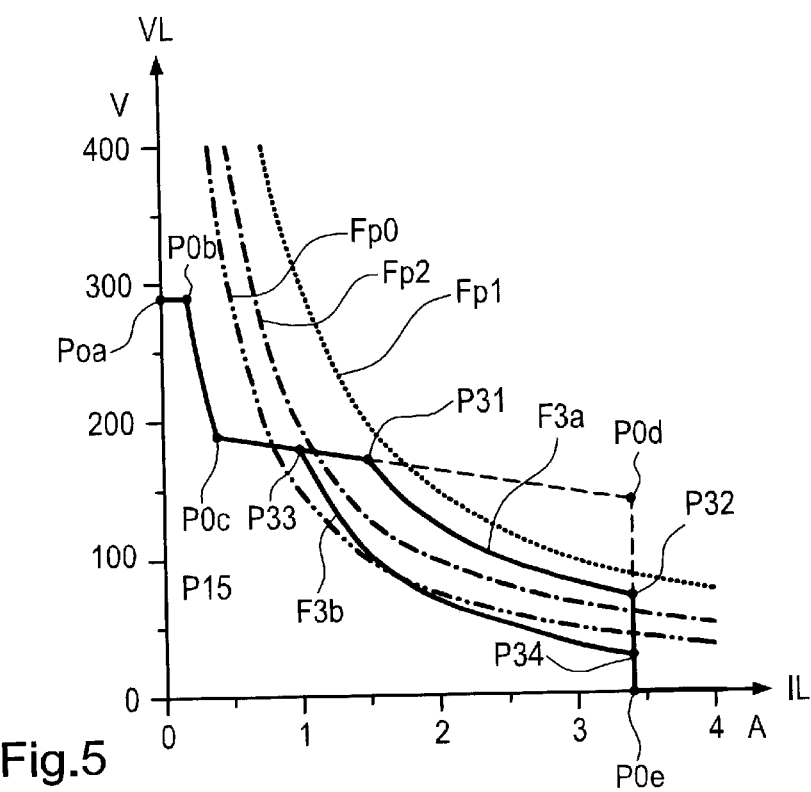
FIG. 5 shows a schematic of an example of the output current-voltage characteristic according to a third embodiment of a feed device of a light source device in accordance with the invention.

By this arrangement of the dc source (Mx) and by fixing the voltage of the reference voltage source (V32) such that the upper limiting value of the above described output power is fixed at less than or equal to roughly twice as high as the nominal electric power of the lamp, the output current-voltage characteristic of the feed device (Ex) which was formed by the combination of the dc source (x) with the ballast circuit (Bx) is shown using the characteristic (F3a) between the points (P0a), (P0b), (P0c), (P31), (P32), and (P0e) in FIG. 5, even if a ballast circuit (Bx) is used in which the output current-voltage characteristic of a glow discharge with a characteristic (F0a) is shown.

Since the above described ballast circuit (Bx) has its own power loss, the electric power supplied to the lamp becomes smaller than the upper limiting value of the above described output electric power which has been set in the dc source (MX). The power loss in the respective part of the above described ballast circuit (Bx) becomes larger, the larger the lamp current (IL) becomes. The power supplied to the lamp therefore becomes smaller. Therefore the voltage of the reference voltage source (V32) must be fixed with consideration of this point.

This design of the feed device, as was already described in the advantages of the invention, in the feed device in accordance with the invention with the arrangements which are described in FIG. 1, FIG. 12 and FIG. 13 and which implement the output current-voltage characteristic of a glow discharge shown in FIG. 5, fixes the electric power which goes beyond a certain value in a glow discharge at less than or equal to twice as high as the nominal electric power of the lamp. Therefore, the above described disadvantage of formation of blackening on the inside of the bulb glass in a glow discharge can be eliminated and the degree of maintenance of illuminance can be increased.

In the above described dc source control circuit (Fb) in FIG. 13, as was described above, excess current was supplied to the resistor (R32) by the output signal of the output power limiter circuit (Wb) and thus the output voltage of the dc source (Mx) was reduced. But the setpoint of the output voltage can also be reduced by controlling the voltage of the reference voltage source (V31) by the signal (Sb9) of the operational amplifier (A36).

Using the operational amplifier (A36), an error integration circuit was formed which executes integration proceeding from the error of the upper limiting value of the output electric power. But in the case in which exactness of the characteristic (F3a) is not required, an arrangement is also possible in which the output power limiter circuit (Wb) produces a signal which is formed by subtraction ((signal (Sb8) from the multiplying device (M32) minus (upper limiting value of the output electric power)). When it becomes negative, of course if necessary a terminal diode or the like can be inserted so that the output voltage of the dc source (Mx) is not reduced. But in the case in which the output power limiter circuit (Wb) is operated with a single power source, this measure is not necessary.

Furthermore, instead of an expensive multiplying device (M32), a cheap adder can be used in which the output voltage signal (Sbf) (or the signal (Sb1) corresponding to it) and the output current signal (Sbi) (or the signal (Sb3) corresponding to it) are each added to one another with the addition of a suitable coefficient. In this case, the area between the points (P31) and (P32) of the characteristic (F3a) in FIG. 5 has an essentially rectilinear shape instead of the given essentially hyperbola shape; in practice this engenders no disadvantage.

As was described in the means for achieving the object of the invention, to eliminate the defect of formation of blackening on the inside of the bulb glass in a glow discharge, the feed device can be arranged such that the electric power supplied to the above described discharge lamp is set at less than or equal to twice as high as the nominal electric power of the above described discharge lamp.

For example, the characteristic shown in FIG. 3 using the characteristic (F2b) between points (P2a), (P23), (P24) and (P2e) or the characteristic shown using the characteristic (F2c) between points (P2a) and (P2e) are possible.

In a detailed examination of FIG. 6 in which the test result is shown, it however becomes apparent that the degree of maintenance of the illuminance by the characteristic (F2a) is slightly higher than the degree of maintenance of the illuminance by the characteristic (F1a). Therefore a difference has formed. The glow discharge voltage of the test lamp is, therefore, greater than or equal to roughly 150 V. It can be imagined that the reason for formation of the above described difference is that for a characteristic (F2a) only less than or equal to 1.33 times as high an electric power as the nominal electric power of the lamp was supplied, while at a characteristic (F1a) an electric power almost twice as high as the nominal electric power of the lamp was supplied if only the above described voltage range is considered. FIG. 3 gives the current-voltage characteristic (Fp2) which corresponds to a constant power which is 1.33 times as high as the nominal electric power of the lamp.

Therefore, it is desirable, in a discharge lamp, in a lamp region with greater than or equal to the minimum voltage of the glow discharge voltage which can actually arise, for the electric power supplied to the above described discharge lamp to be less than or equal to 1.5 times as high as the nominal electric power of the discharge lamp. It is, furthermore, apparent that it is ideal if it can be kept less than or equal to 1.33 times.

FIG. 2, FIG. 4 and FIG. 5 give the current-voltage characteristic (Fp2) which corresponds to a constant electric power which is 1.33 times as high as the nominal electric power of the lamp. For example, the characteristic shown using the characteristic (F1b) between points (P0a), (P0b), (P0c), (P14), (P15), (P16) and (P0e) is more desirable than the characteristic shown using the characteristic (F1a) in FIG. 2. Furthermore, the characteristic shown using the characteristic (F3b) between points (P0a), (P0b), (P0c), (P33), (P34) and (P0e) is more desirable than the characteristic (F1B) shown using the characteristic (F3a) in FIG. 5.

The response rate of the circuit in the production of the output current-voltage characteristic of a glow discharge in a feed device of a light source device in accordance with the invention which is shown using the above described characteristics (F1a), (F1b), (F2a), (F2b), (F2c), (F2e), (F3a) or (F3b), need not be very high.

The reason for this is that it can be imagined that, from the interval during which a glow discharge is formed the ratios of the stable glow discharge interval (T11) and the interval (T120) during which the glow current increases are large. During this interval, the voltage changes only a little. Furthermore, the interval (T21) during which the glow voltage decreases is short. Therefore, the details of the temporary response to formation of blackening on the inside of the bulb glass has only little effect.

In the case of plotting of the output current-voltage characteristic of a glow discharge, therefore, the frequency bands of the switching devices shown in FIG. 7, FIG. 8, FIG. 9, FIG. 10 and in FIG. 13, such as the operational amplifier, the comparator, the transistors and the like, as well as the response delay, need not be heavily considered. Plotting using a direct current is sufficient.

Specifically, instead of a discharge lamp, a variable load is connected to the feed device. When measuring of the change of the output current (IL) in a gradual change of the load in the state in which the output current-voltage characteristic of a glow discharge appears, the time which is required from 10% to 90% is shorter than or equal to 5 ms, the interval before the change being fixed at 0% and the duration after the change being fixed at 100% is sufficient.

The variable load to be connected is a load with a resistance value which changes gradually, i.e., specifically a load which is formed by a connection of two resistors in series, one of which is short circuited by a switching device, such as FET or the like. But a load, such as a so-called Zener diode or the like, in which the Zener voltage changes gradually, specifically a load which is produced as follows, is more suitable because the characteristic of the lamp in an actual glow discharge state is approached;

A so-called source-follower circuit in which one end of the resistor is connected to the source terminal of the FET is formed.

The drain terminal of the above described FETs and the other end of the above described resistors are connected as the two ends of the load to the feed device.

Between the gate terminal of the above described FETs and the above described other end of the above described resistors, a control voltage is applied which is gradually changed.

As a result, for example, in an actual light source device in which a discharge lamp is connected as the load, in practice there is no disadvantage even if the indicated characteristic with respect to the plotted characteristic has a temporarily deviating area in the case in which the lamp current (IL) and the lamp voltage (VL) are measured with an oscilloscope and the output current-voltage characteristics which correspond to the representations in FIG. 2, FIG. 3, FIG. 4, FIG. 5 and the like are displayed using a display mode which is called the XY mode.

The aforementioned description relates mainly to the light source device of the internal trigger starter type which is shown in FIG. 1 and which is driven using a direct current. As was described above, operation of the feed device and the behavior of the discharge lamp when starting one such discharge lamp are identical to those in a light source device which is driven using an alternating current. In a light source device of the ac drive type in which an alternating discharge voltage is applied to the discharge lamp (Ld') by the arrangement of a fall bridge inverter shown in FIG. 14 by switching devices (Q1, Q2, Q3, Q4), such as FET or the like, being added to the rear stage of the ballast circuit, the action of the invention can be advantageously developed.

Figure 14:
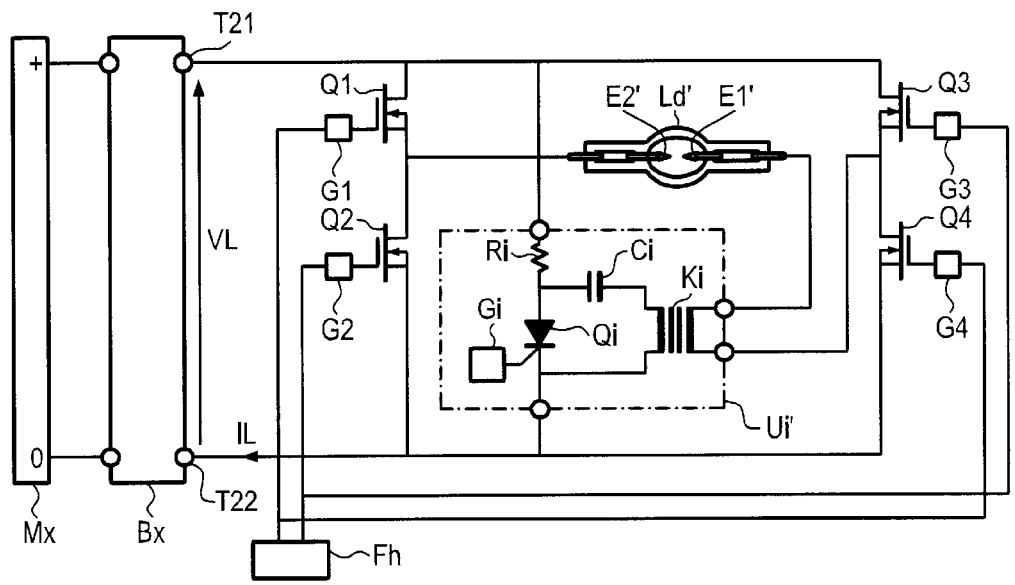
FIG. 14 shows a schematic of a simplified example of the arrangement of a light source device in accordance with the invention, of the internal trigger starter type, which is driven using an alternating current.
Figure 15:
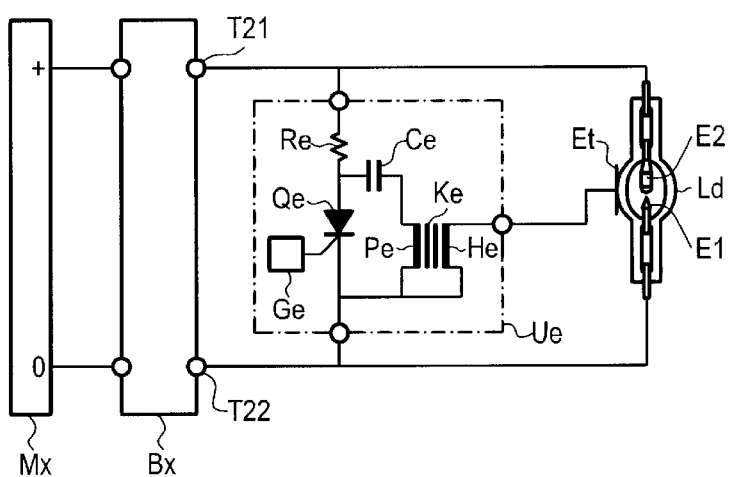
FIG. 15 shows a schematic of a simplified example of the arrangement of a light source device in accordance with the invention, of the external trigger starter type, which is driven using a direct current.
Figure 16A:
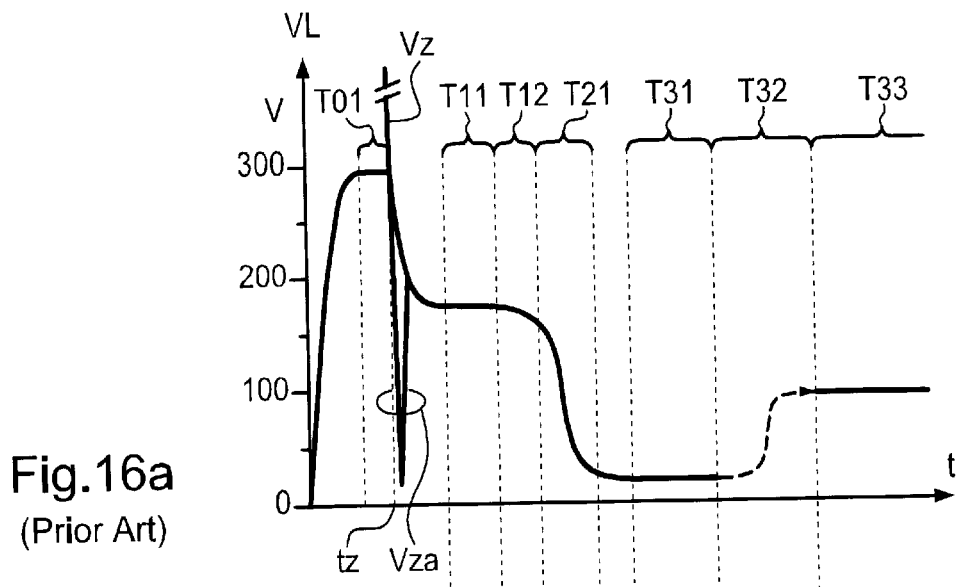
FIG. 16 (a) shows a schematic of the time change of the lamp voltage of a light source device using a high pressure mercury lamp.
Figure 16B:
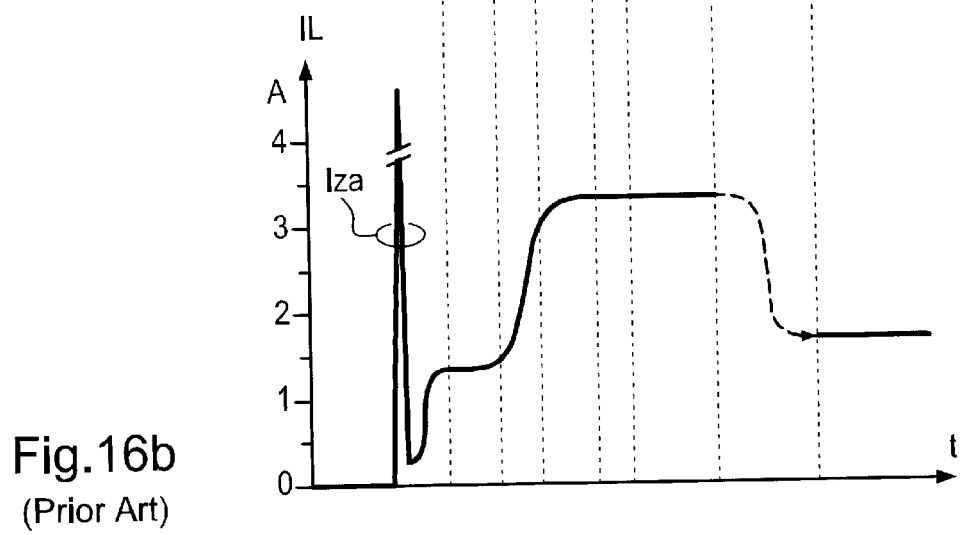

The action of the invention is advantageously developed also in a light source device not only of the internal trigger type in FIG. 1 and FIG. 14, but in a light source device of the external trigger type (of the dc drive type or of the ac drive type) as shown in FIG. 15, in which there is an auxiliary electrode (Et) in the discharge lamp (Ld) and a high voltage is applied by a starter (Ue) between electrodes (E1, E2) and the above described auxiliary electrode (Et), because it apparently does not depend on the starter type.

In these application documents, only what is most necessary in the circuit is described to explain the operation, function and the action of the light source device in accordance with the invention. It can therefore be assumed that further details of switching operation described in the embodiments, for example, the polarity of the signals, the specific choice, the specific addition and the omission of switching devices or concepts, such as changes and the like based on facilitation of procurement of the components and for economic reasons are intensively used in the practice of construction of an actual device.

It is assumed that especially a device for protecting the switching devices of a feed device, such as switching devices like FETs or the like, against damage factors, such as an electric power beyond a certain value, a current beyond a certain value, overheating or the like, or a device which reduces the formation of radiation "noise" and line "noise" which form according to the operation of the switching devices of the feed device, or which prevents the "noise" which has formed from being released to the outside, for example a snubber circuit, a varistor, a clamp diode (including the "pulse-by-pulse" method), a current limiter circuit, a noise filter choke with a "common mode" or "normal mode", a noise filter capacitor and the like, if necessary is added to the respective part of the circuit arrangements described in the embodiments.

The arrangement of the light source device in accordance with the invention is not limited to the circuit types described in the embodiments in the application documents and is not limited to the forms of the characteristics of the output current-voltage characteristic which are described in the embodiments.

Furthermore, for example, the above described overall controller (Xpu) of the feed control circuit (Fx) in FIG. 7 subjects the lamp voltage signal (Sv) which corresponds to the lamp voltage (VL) to A/D conversion and, on this basis, sets the setpoint signal (St) for controlling the chopper capacity. The lamp current signal (Si) which corresponds to the lamp current (IL) is also subjected to A/D conversion, and the setpoint signal (St) for controlling the chopper capacity is changed and set such that the resulting current value agrees with the setpoint current value. In this way, the action of the invention when the accuracy and function are increased is advantageously developed, such that the effect of the scattering of the parameters of the respective switching device is corrected, or conversely in a diversification of the arrangement of the light source device, such as simplification, such that, for example the above described microprocessor unit (MPU) is eliminated and instead of it a simpler control circuit is used.

In the feed device of the invention described in FIG. 1 the electric power exceeding a certain value in a glow discharge is suppressed to no more than twice the nominal electric power of the lamp. Therefore, the above described defect of the formation of blackening on the inside of the bulb glass in a glow discharge can be eliminated and the degree of maintenance of the illuminance can be increased.

In the feed device in the invention described in FIG. 2, the power supply of the dc source to the ballast circuit is suppressed. As a result, the electric power exceeding a certain value in a glow discharge is suppressed to less than or equal to twice the nominal electric power of the lamp. Therefore, the above described defect of the formation of blackening on the inside of the bulb glass in a glow discharge can be eliminated and the degree of maintenance of the illuminance can be increased.

We claim:

1. A light source device comprising:

a discharge lamp having a discharge space containing at least 0.15 mg mercury per cubic millimeter of the volume of the discharge space, a pair of electrodes positioned opposite one another in the discharge lamp, a feed device connected to said discharge lamp for starting the discharge lamp and supplying a discharge current to the electrodes, wherein the feed device performs an identification function identifying a discharge state of the discharge lamp as a glow discharge state, and wherein the feed device is set to supply an electric power to the discharge lamp during an identification of the glow discharge state that is less than or equal to twice the nominal electric power of the discharge lamp.

2. A light source device comprising:

a discharge lamp having a discharge space containing at least 0.15 mg mercury per cubic millimeter of the volume of the discharge space, a pair of electrodes positioned opposite one another in the discharge lamp, a feed device connected to said discharge lamp for starting the discharge lamp and supplying a discharge current to the electrodes, wherein the feed device comprises a ballast circuit and a DC source to supply the ballast circuit, and wherein the DC source controls its power supply capacity such that the discharge lamp is set at less than or equal to twice the nominal electric power of the discharge lamp.

* * * * *